(12) United States Patent
Naudin et al.

(10) Patent No.: US 6,269,214 B1
(45) Date of Patent: Jul. 31, 2001

(54) DEVICE FOR INTERCONNECTING OPTICAL FIBER CABLES

(75) Inventors: Thierry Naudin, Orvault; Christophe Corbille, Saint Nicolas de Redon; Hervé Brunet, Saint Nazaire, all of (FR)

(73) Assignee: Pouyet, S.A. (FR)

( * ) Notice: Subject to any disclaimer, the term of this patent is extended or adjusted under 35 U.S.C. 154(b) by 0 days.

(21) Appl. No.: 09/365,623

(22) Filed: Aug. 2, 1999

(51) Int. Cl.⁷ ..................................................... G02B 6/00
(52) U.S. Cl. ................................................................ 385/135
(58) Field of Search ..................................... 385/135, 134, 385/136, 137

(56) References Cited

U.S. PATENT DOCUMENTS

| | | | |
|---|---|---|---|
| 4,911,521 | * | 3/1990 | Ryuoto et al. ........................ 385/135 |
| 5,420,958 | * | 5/1995 | Henson et al. ....................... 385/135 |
| 5,724,467 | * | 3/1998 | vandenEnden et al. ............. 385/134 |
| 5,745,633 | * | 4/1998 | Giebel et al. ........................ 385/136 |
| 5,838,858 | * | 11/1998 | White .................................... 385/76 |
| 5,870,515 | * | 2/1999 | Ott et al. ............................... 385/59 |
| 5,982,971 | * | 11/1999 | Amirkalali ........................... 385/135 |
| 6,014,490 | * | 1/2000 | Canning et al. ..................... 385/135 |
| 6,061,492 | * | 5/2000 | Strause et al. ....................... 385/135 |
| 6,151,437 | * | 11/2000 | Cherbettchian et al. ............ 385/136 |

* cited by examiner

*Primary Examiner*—Georgia Epps
*Assistant Examiner*—John J. Magee
(74) *Attorney, Agent, or Firm*—Richard P. Gilly

(57) ABSTRACT

An optical fiber organizer and a box for receiving it. The inlets for the optical cables project side-by-side in row abreast from the same short side of the box bottom. The organizer includes a pedestal which receives, in nested manner, stackable modules for holding cassettes. The pedestal is made of a plastics material and has an outside shape that is rounded. A transit empty space is provided before the pedestal for the purpose of passing the fibers, and a storage empty space is provided after the pedestal for the purpose of storing standby fibers.

10 Claims, 17 Drawing Sheets

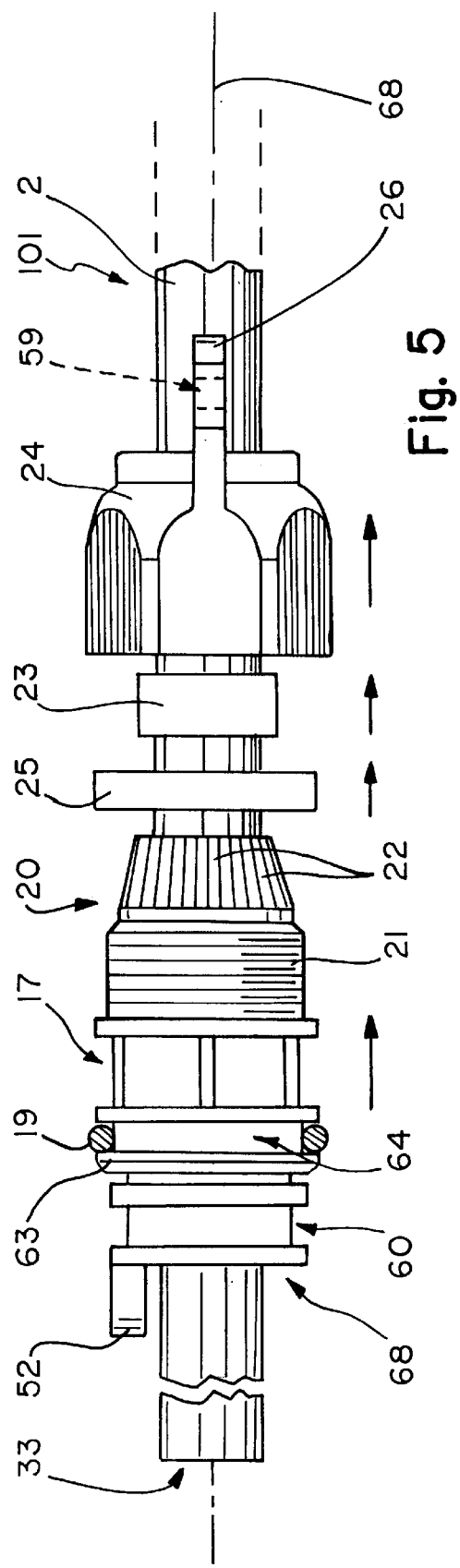
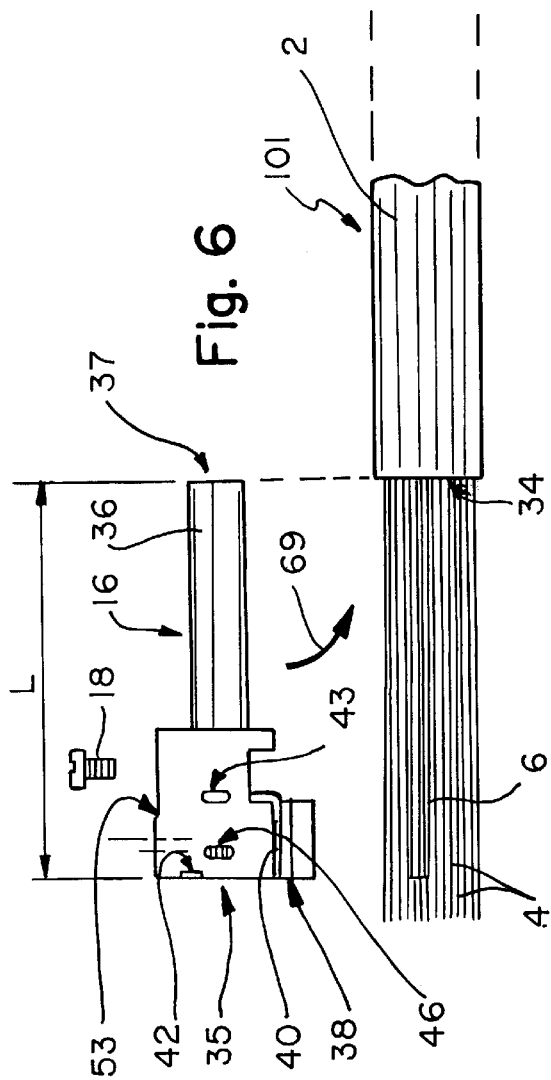

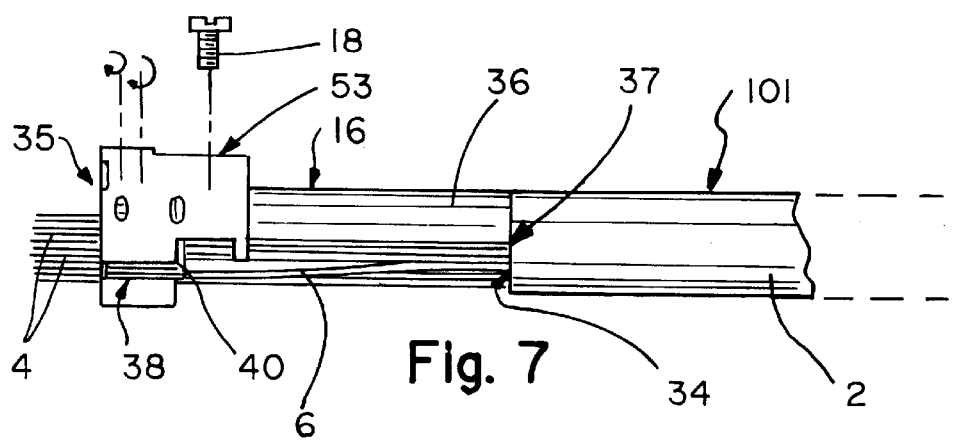
Fig. 7
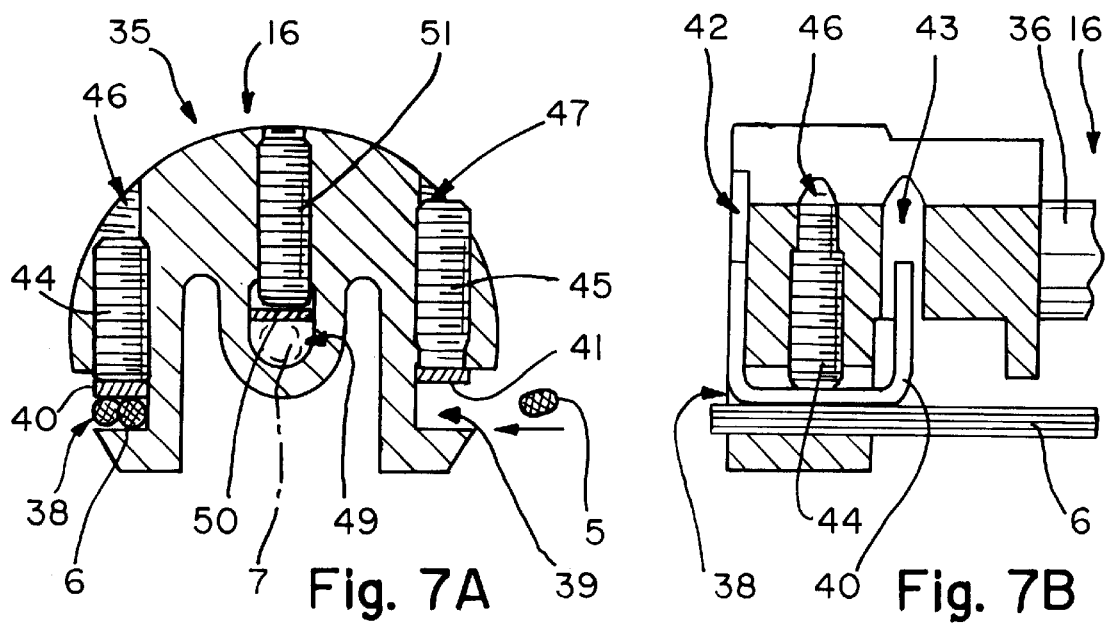
Fig. 7A
Fig. 7B
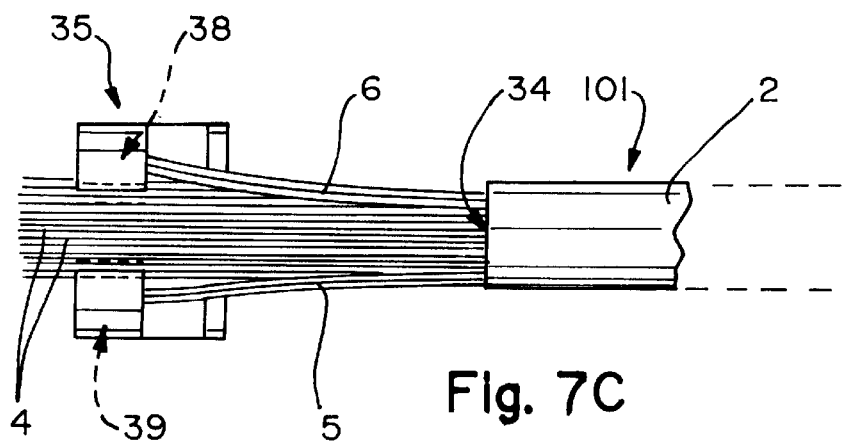
Fig. 7C

DEVICE FOR INTERCONNECTING OPTICAL FIBER CABLES

The present invention relates to a device for interconnecting optical fiber cables. It relates more particularly to a watertight splice box for interconnecting optical fiber cables, such a device being referred to as an "optical organizer" box. It also relates to an optical organizer, in particular suitable for equipping such a box.

BACKGROUND OF THE INVENTION

An optical organizer box comprises a watertight box made up of a fixed bottom and of a removable lid, which box receives at least two optical fiber cables and at least contains one or more "cassettes" for storing splices and surplus lengths of optical fiber, and often also contains storage means for storing standby fibers waiting to be used, e.g. fibers from a "through cable", i.e. a cable merely passing through the box with its fibers broken out and optionally stripped, standing by in said box for subsequent use.

Such a box, and its contents constitute a structure comprising various elements that must perform the following four functions:

Function I: securing and sealing the optical fibers in inlets;

Function II: directing the optical fibers towards the optical organizer proper;

Function III: storing the splices and the surplus lengths of optical fiber in cassettes equipping the organizer proper; and Function IV: optionally storing standby optical fibers, in particular optical fibers of a "through cable".

The structure of organizer boxes currently sold by the Applicant includes, inside the box, a metal securing plate for securing the optical cables, followed by a zone in which the optical fibers are directed and in which the standby fibers are stored, which zone lies under a metal plate for receiving the cassettes for storing the splices and the surplus lengths of optical fibers.

OBJECTS AND SUMMARY OF THE INVENTION

An object of the invention is to provide a watertight optical organizer box which is, in particular, more compact, more simple, more universal because it is modular and therefore capable of accepting a number of cassettes that is chosen as a function of needs, and more user-friendly and practical by being easier to fit and to use, than previously known devices of this type. Another object of the invention is to provide an optical organizer that is practical, simple, modular, and functional, such an organizer being, in particular, suitable for equipping such a box.

To this end, the invention provides a watertight device designed for interconnecting optical fiber cables, the device being in the form of a watertight box referred to as an "optical organizer" box which is made up of a substantially flat bottom and of a lid, and which includes means for performing the following four functions:

securing and sealing the optical fibers in inlets;

directing the optical fibers towards the optical organizer proper;

storing the splices and the surplus lengths of optical fiber in pivotally-mounted cassettes equipping said organizer; and optionally storing standby optical fibers, in particular optical fibers of a "through cable";

wherein:

for each cable, the device includes an inlet device for providing a watertight cable inlet and for securing the strength members of the cable, which inlet device is fitted to the cable prior to inserting said cable into the box, the outer sheath of the cable then being secured directly on said watertight inlet device and upstream from its sealing means;

all of the watertight inlet devices then being received by being plugged into the same side of the box and then being locked therein merely by keying;

the optical organizer which is separated from the inlet devices by an empty transit space through which the broken-out optical fibers pass, includes a pedestal which is fixed to the bottom of the box and which receives one or more cassette-holding modules for holding cassettes for storing splices and surplus lengths;

each module receiving one or more cassettes so that each cassette can tilt, in known manner, through at least 90 degrees about its base; the modules being stackable in nested manner and in a direction that slopes, in known manner, relative to the plane of the bottom of the box sufficiently to enable each cassette to tilt in this way;

the means, acting by clipping, are organized to hold each cassette in either one of its two end-of-tilt positions;

the pedestal is followed by a second empty space optionally organized to receive other optical fibers referred to as "standby" optical fibers; and the edges of the box bottom are of a height that is sufficiently small as to enable all of the cassettes in the stack to be accessed freely from the sides.

Preferably, the invention provides such an optical organizer box;

wherein:

a) for the optical cables, the optical organizer box includes respective watertight cable-inlet devices that are disposed side-by-side in row abreast on the same side of the box, and that are positioned in a plane parallel to the plane of the bottom of the box, each of the respective cable-inlet devices comprising:

at the front: a rigid securing solepiece provided with orifices or slots into which central strength members and/or side strength members of the cable are inserted, each of these orifices or slots co-operating with a clamping member typically acting by a screw being rotated to clamp the strength member(s) that it receives;

at the rear: a nut for clamping a stuffing box, which nut is also shaped to receive a retaining member for retaining the outer sheath of the optical cable; and between the front and the rear: a sealing tubular body whose front portion engages telescopically into said securing solepiece, means being provided for fixing the sealing body to the securing solepiece in the engaged position, the rear portion of the tubular body co-operating with a sealing ring to form the sealing stuffing box that is complementary to said clamping nut, the stuffing box achieving the sealing by clamping on the outer sheath of the cable;

the sealing body also receiving means for providing the sealing relative to the inlet passageway in the chamber or container, and further including an abutment member which is designed to co-operate with a complementary shape of said inlet passageway to limit the insertion of the device through said inlet passageway, the abutment position then being such that the head of the device emerges inside the chamber or container, keying means then being provided for locking the device in this position;

b) said pedestal is made of a plastics material and has an outside wall that is orthogonal to the bottom of the box, which wall is rounded to guide the optionally stripped optical fibers of said cables without damaging them on either side of said pedestal;

the pedestal receiving in plug-in manner support blocks, each of which supports in hinged manner one or more cassettes for storing splices and surplus lengths of fibers, the support blocks being superposable by plugging into one another in nested manner with a stepped offset being provided from one cassette to the next in the stack, this offset being provided, in a manner known per se, at an offset angle of about 45 degrees which corresponds to a step length substantially equal to the thickness of a cassette, so that it is possible in conventional manner to pivot each cassette of the stack through 90 degrees;

each of the support blocks being provided with clipping means for locking each cassette in two positions, namely a first locking position in which the cassette is parallel to the plane of the bottom of the box, and a second locking position in which the cassette has been rotated about its hinge pins and on its support block through one fourth of a turn so that it is orthogonal to the plane of the bottom of the box; and c) the pedestal and the box bottom are designed to delimit a second empty space between the pedestal and the box side that is opposite from the cable inlets and from said transit space, which second empty space is suitable for receiving standby fibers, at least a portion of the second empty space being situated under the first cassette at the bottom of the stack when said cassette is in its first above-mentioned position, and is then cantilevered out over said second empty space, support means for supporting said first cassette in this cantilevered-out position being provided accordingly on said pedestal.

Advantageously, said second empty space is organized to receive at least one cassette for coiling said standby fibers.

The invention also provides an optical organizer, in particular serving to equip such a box;
wherein:

said optical organizer includes a pedestal which receives one or more cassette-holding modules for holding cassettes for storing splices and surplus lengths;

each module receiving one or more cassettes in a manner such that each cassette can tilt, in a manner known per se, through at least 90 degrees about its base;

the modules being stackable in nested manner in a direction which slopes, in a manner known per se, sufficiently to enable each cassette to tilt in this way; and means acting by clipping are provided to hold each cassette in either one of its two end-of-tilt positions.

In particular, the invention provides such an optical organizer;
wherein:

said optical organizer includes a pedestal made of a plastics material and having an outside wall that is orthogonal to the bottom of the box, which wall is rounded to guide the optionally stripped optical fibers without damaging them on either side of said pedestal;

the pedestal receiving in plug-in manner support blocks, each of which supports in hinged manner one or more cassettes for storing splices and surplus lengths of fibers, the support blocks being superposable by plugging into one another in nested manner with a stepped offset being provided from one cassette to the next in the stack, this offset being provided, in a manner known per se, at an offset angle of about 45 degrees which corresponds to a step length substantially equal to the thickness of a cassette, so that it is possible in conventional manner to pivot each cassette of the stack through 90 degrees; and each of the support blocks being provided with clipping means for locking each cassette in two positions, namely a first locking position in which the cassette is parallel to the plane of the bottom of the box, and a second locking position in which the cassette has been rotated about its hinge pins and on its support block through one fourth of a turn so that it is orthogonal to the plane of the bottom of the box.

BRIEF DESCRIPTION OF THE DRAWINGS

The invention can be well understood, and its various advantages and characteristics appear more clearly from the following description of a non-limiting embodiment given with reference to the accompanying diagrammatic drawings, in which:

FIGS. 5 to 12, together with their complementary FIGS. 7A, 7B, 7C, and 12A, diagrammatically show the successive stages in which the cable inlet device is fitted and then put in place;

FIG. 19 is similar to FIG. 18, but applied to the case when a single module is plugged in;

MORE DETAILED DESCRIPTION

With reference firstly to FIGS. 1 to 3, and 14 to 16, a description follows of a watertight splice box for interconnecting four optical fiber cables 101, 102, 103, 104. In the art, such a device may be referred to as an "optical organizer box".

Such a box and its contents constitute a structure comprising various elements that must perform the following four functions:

Function I: securing and sealing optical cables in inlets;

Function II: directing the optical fibers towards the organizer proper;

Function III: storing splices and surplus lengths of the optical fibers in storage cassettes equipping the organizer proper; and Function IV: optionally storing standby fibers, in particular for a "through cable".

Figure 1:
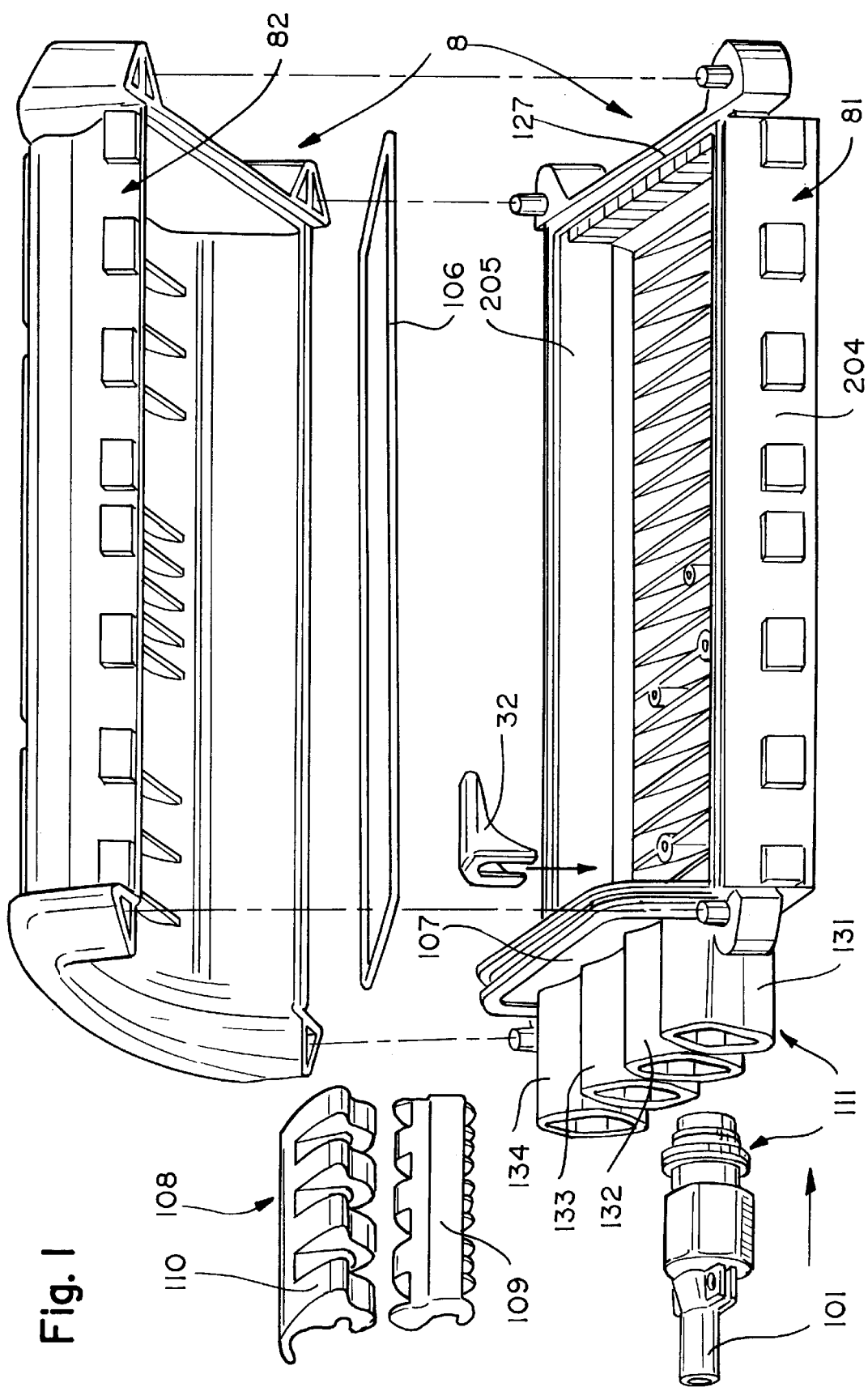
FIG. 1 is a simplified fragmentary perspective view of the box as empty, i.e. without the optical organizer proper.
Figure 2:
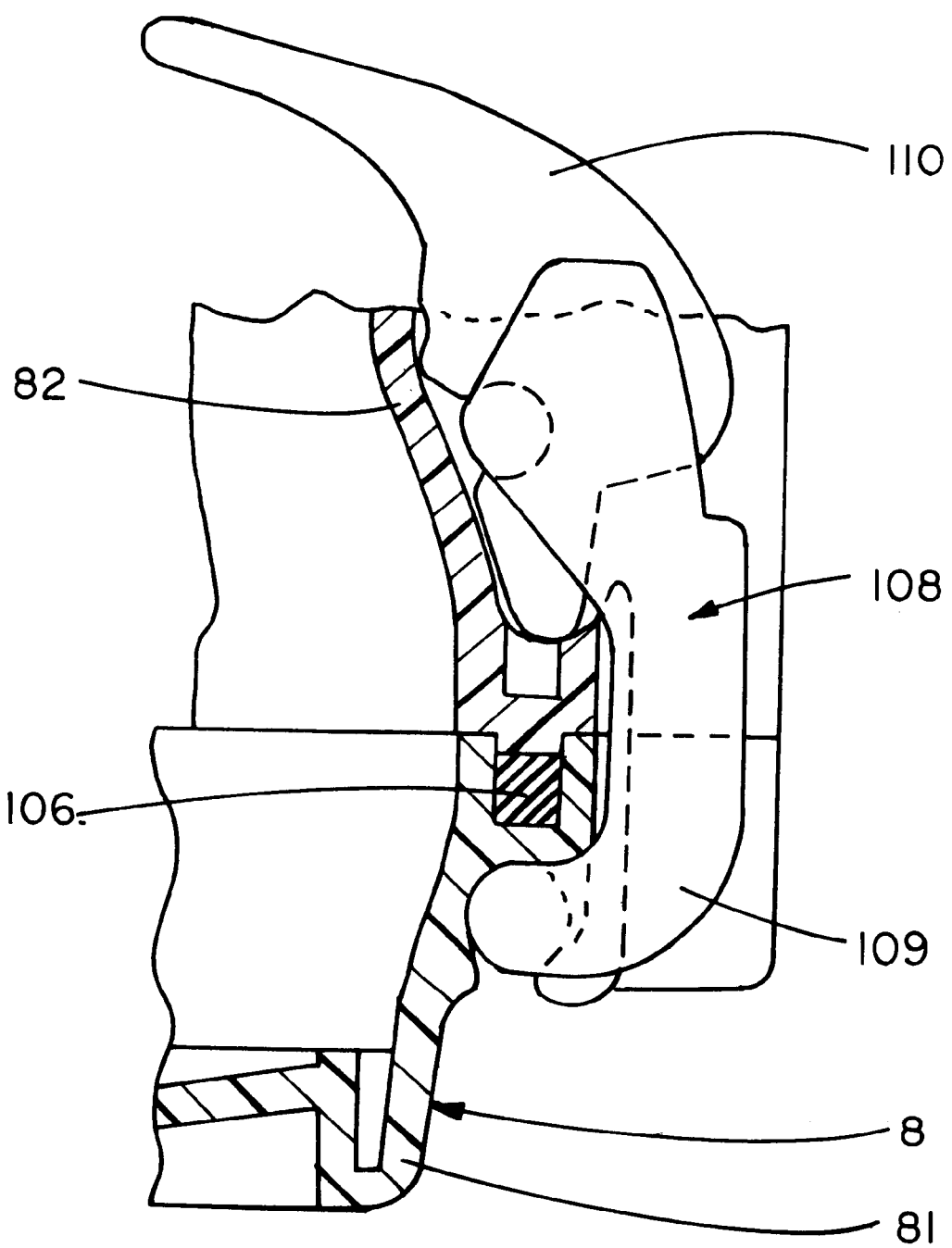
FIG. 2 is a section view of one of the closure devices for closing the box.

FIGS. 1 and 2 more particularly show the empty box or container 8 and its closure system 108, the optical organizer proper not yet being in place in the box 8.

The box 8 comprises a bottom 81 which is flat and substantially rectangular in horizontal section, and a lid 82 which fits on the bottom 81 with a sealing gasket 106 being interposed.

On its two long sides, the bottom 81 is provided with raised edges 204 and 205 which are not very high, and of the order of about I centimeter to give some idea, in order to give good side access to the optical organizer proper.

The short side which receives the four respective inlets 111 to 114 of the four cables 101 to 104 has its raised edge 107 significantly higher, so as to provide the space required to receive the four inlets side-by-side in row abreast.

As described in detail below, each cable inlet device is fitted outside the box 8 to each cable, such as the cable 101, and then the resulting assembly is inserted into a respective inlet sleeve 131 to 134 until it comes into abutment therein, and is then locked by means of a respective key (or optionally a key common to a plurality of cables) 32.

The height of the lid 82 matches the height of the optical organizer which is modular as explained below, and, in a very practical manner, the lid 82 is locked (FIG. 2) by means of a few toggle fasteners 108, each of which is made up of two elements 109 and 110 that are conventionally hinged to each other.

Figure 3:
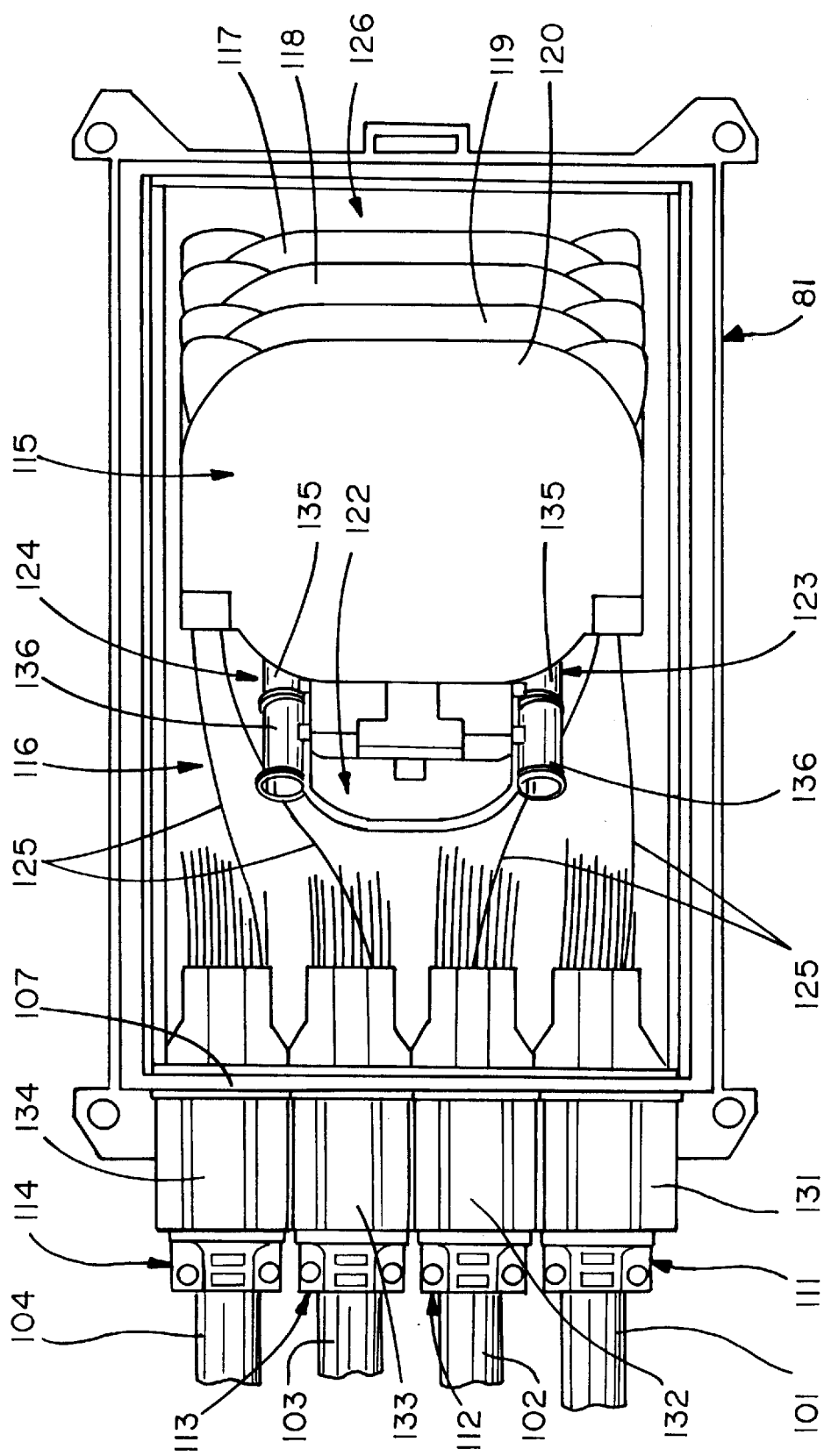
FIG. 3 is a plan view of the optical organizer box, with the cover removed.

FIG. 3 gives an overall idea of the structure of this optical organizer box.

Above-mentioned function I (securing and sealing optical fibers in inlets) is performed quite simply by the four cable inlet devices 111 to 114, all four of which are disposed side-by-side and in the same horizontal plane, i.e. in "row abreast", on the same short side 107 of the box bottom 81. One of the cable inlet devices is described below with reference to FIGS. 4 to 13.

Above-mentioned function II (directing the optical fibers towards the organizer proper 115) is performed simply, and without requiring "over-tubing" on the stripped optical fibers, firstly by means of the presence of an empty transit space 116 without any metal portions and that follows on from the cable inlets 111 to 114, and secondly by means of the fact that the tilting cassettes 117 to 120 that equip the organizer 115 are carried by a pedestal 122 made of a plastics material and whose shape is rounded at least over its side portions 123 and 124 (see also FIG. 15) so as to guide the optical fibers 125 "gently", without any danger of damaging them when, as shown in FIG. 3, they have been stripped without providing them with "over-tubing" (i.e. without each of them being provided with a small flexible tube offering mechanical protection).

Above-mentioned function III is performed conventionally by means of the cassettes 117 to 120 which, overall, and at least as regards this function, are not particularly original except for a few details that are described below.

Figure 14:
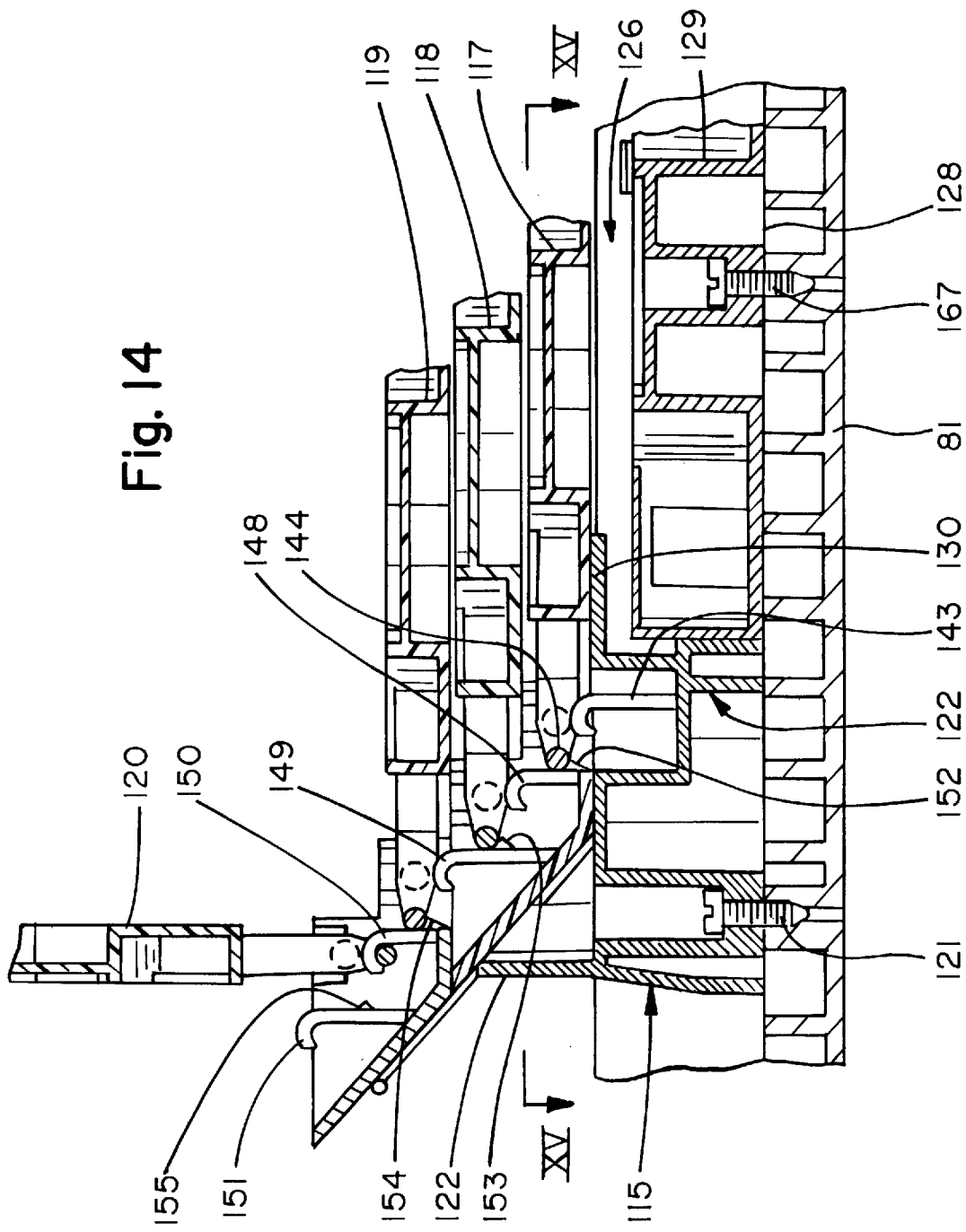
FIG. 14 is a vertical longitudinal section view on XIV—XIV of FIG. 15, showing the optical organizer proper.
Figure 15:
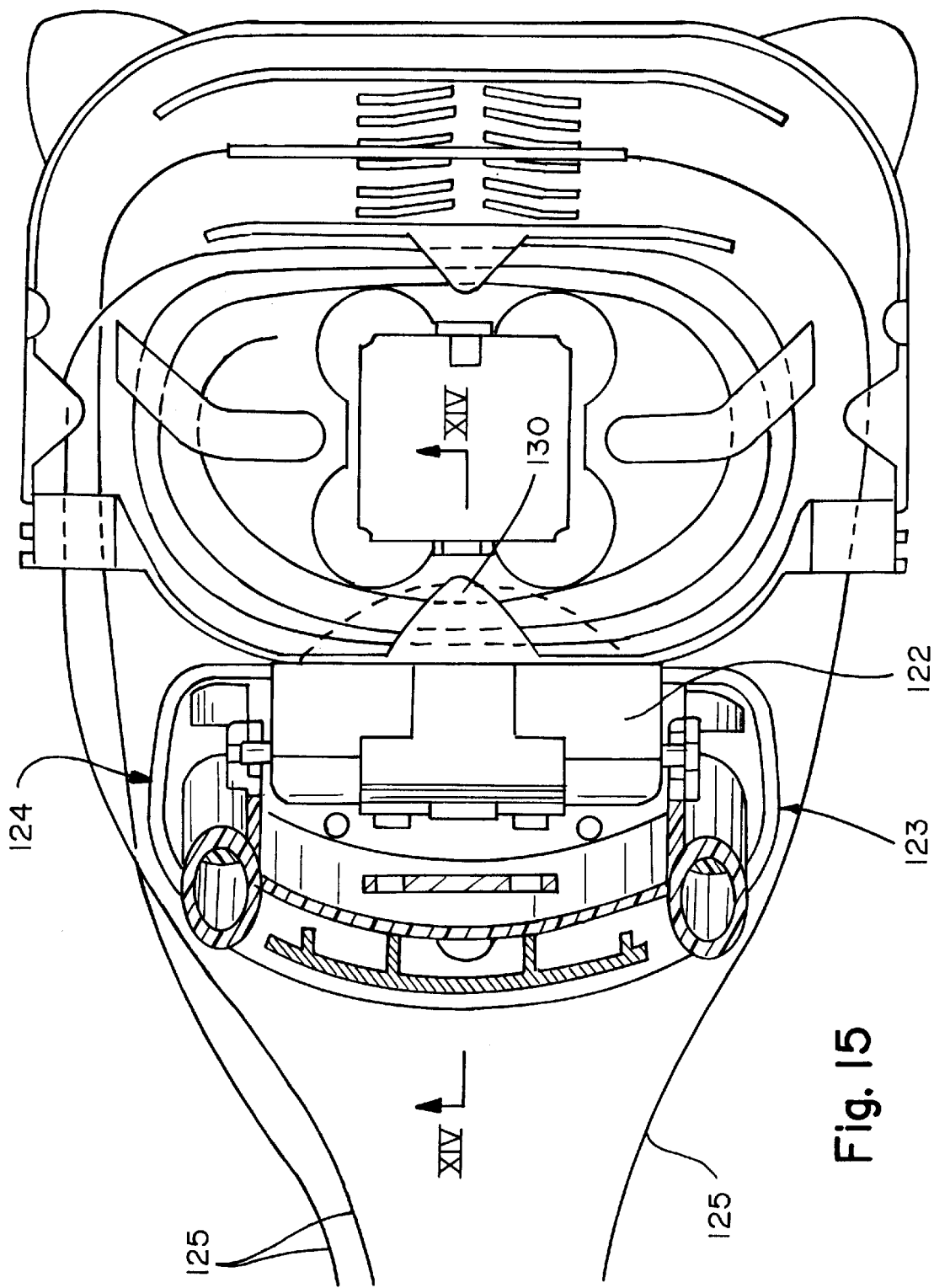
FIG. 15 is a horizontal section view on XV—XV of FIG. 14, showing the optical organizer, with the bottom of the box not being shown.
Figure 16:
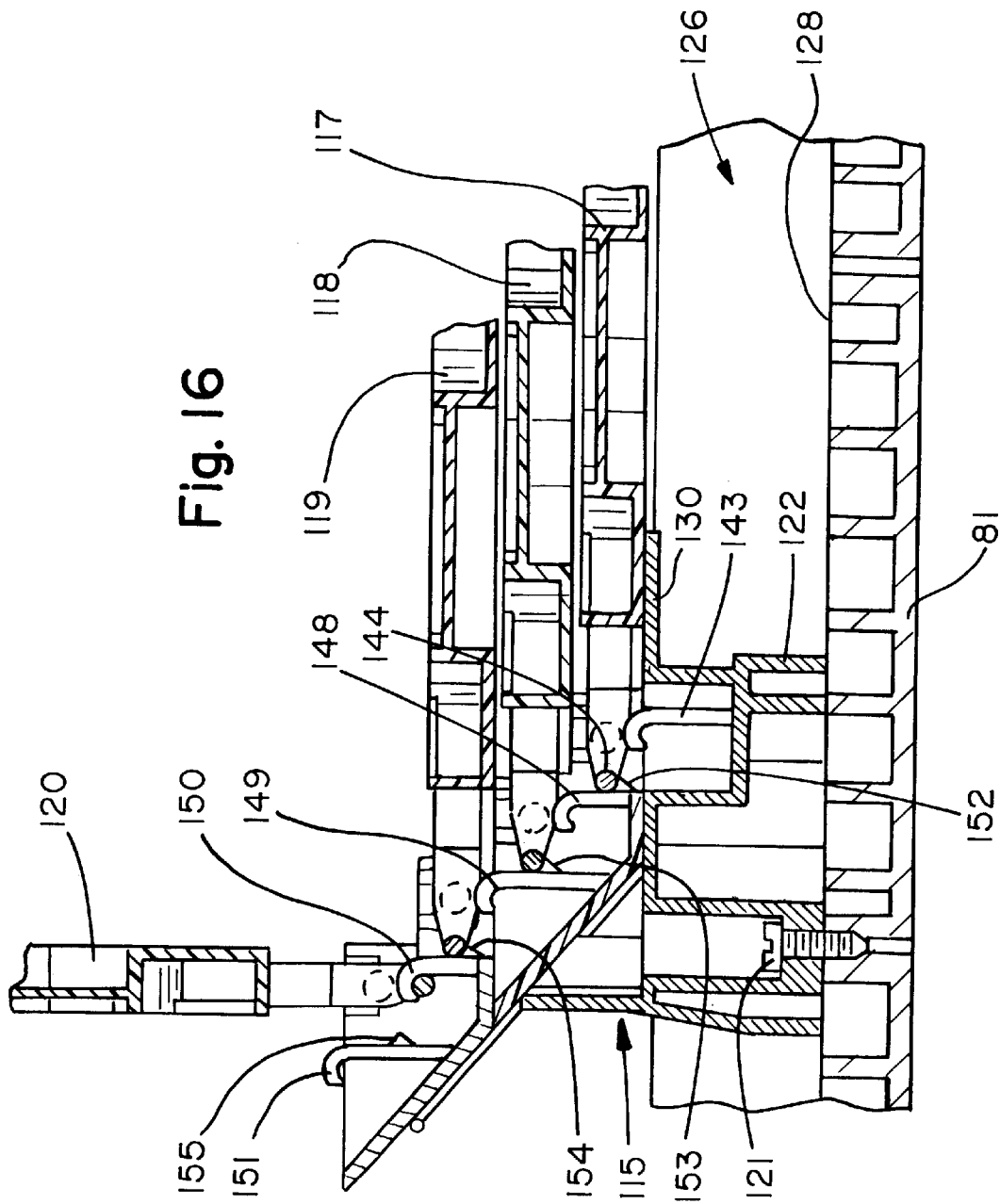
FIG. 16 is a view similar to FIG. 14, without the coiling cassettes.

Above-mentioned function IV is performed (FIGS. 14 and 16) by means of the presence of a second empty space 126 which is situated between the pedestal 122 and the short side 127 (FIG. 1) opposite from the short side 107, this empty space 126 being situated under the bottom cassette 117 in the stack of cassettes 117–120 when said cassette 117 is in its horizontal position (parallel to the bottom plane 128 of the box) as shown in FIGS. 14 and 16.

In FIG. 16, the space 126 is kept totally empty, and it can thus receive standby fibers, especially either fibers that are not stripped, or else fibers that are stripped but that are provided with "over-tubing".

Figure 23:
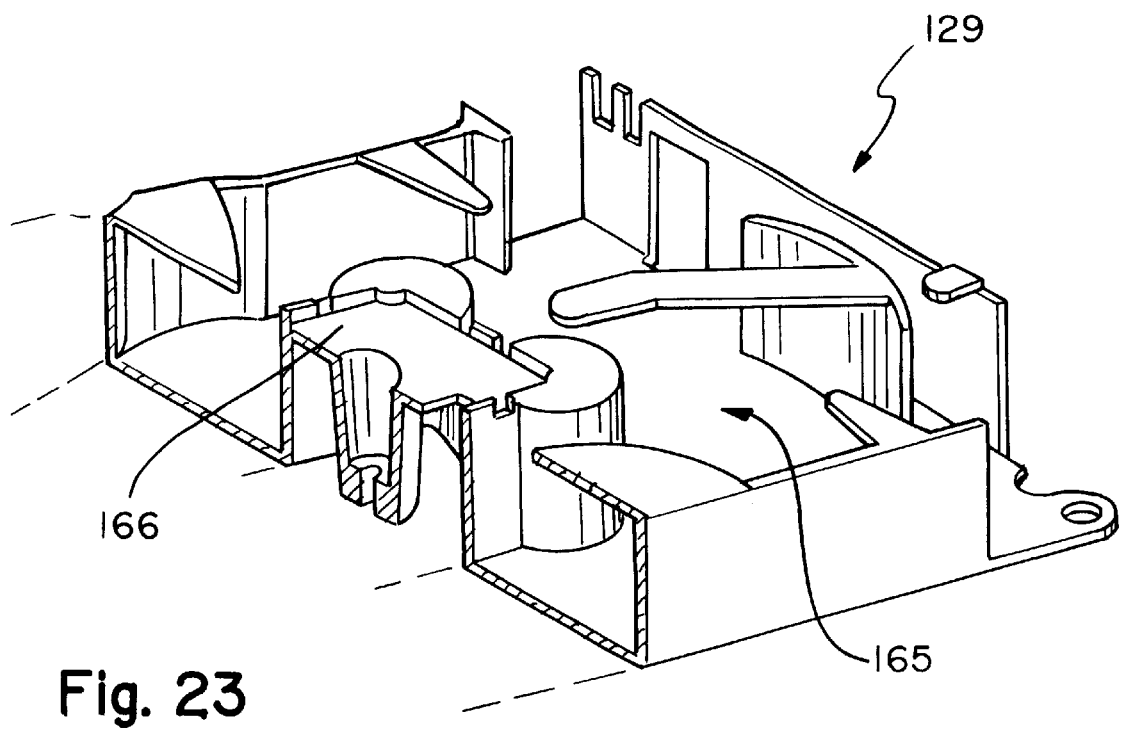
FIG. 23 is a perspective view of the coiling cassette shown cut in half

In FIG. 14, the space 126 receives a coiling cassette 129 for coiling "standby" stripped fibers. Such a coiling cassette 129 is shown in perspective in FIGS. 17 and 23.

One of the four cable inlet devices 111 to 114, namely the cable inlet device 111 relating to the cable 101, is described below with reference to FIGS. 4 to 13.

The cable 101 is provided with a strong semi-rigid outer sheath 2 which protects a set of small flexible tubes 3, each of which contains a few optical fibers 4 themselves often embedded in a protective and sealing grease.

In addition, two semi-rigid strength members 5 and 6, e.g. made of aramid fibers, are provided inside the sheath 2, and they are referred to as "peripheral strength members" because they are positioned close to the sheath 2 on either side of the middle longitudinal axis of the optical cable 101.

The free end of the cable 101 is stripped, i.e. the sheath 2, the small protective tubes, and the sealing grease are removed.

The strong outer sheath 2, the strength members 5, 6, the small tubes 3, and the grease coating the fibers 4 are mechanical protections for the optical fibers 4 and they are made necessary because optical fibers cannot withstand any mechanical stress.

Figure 4:
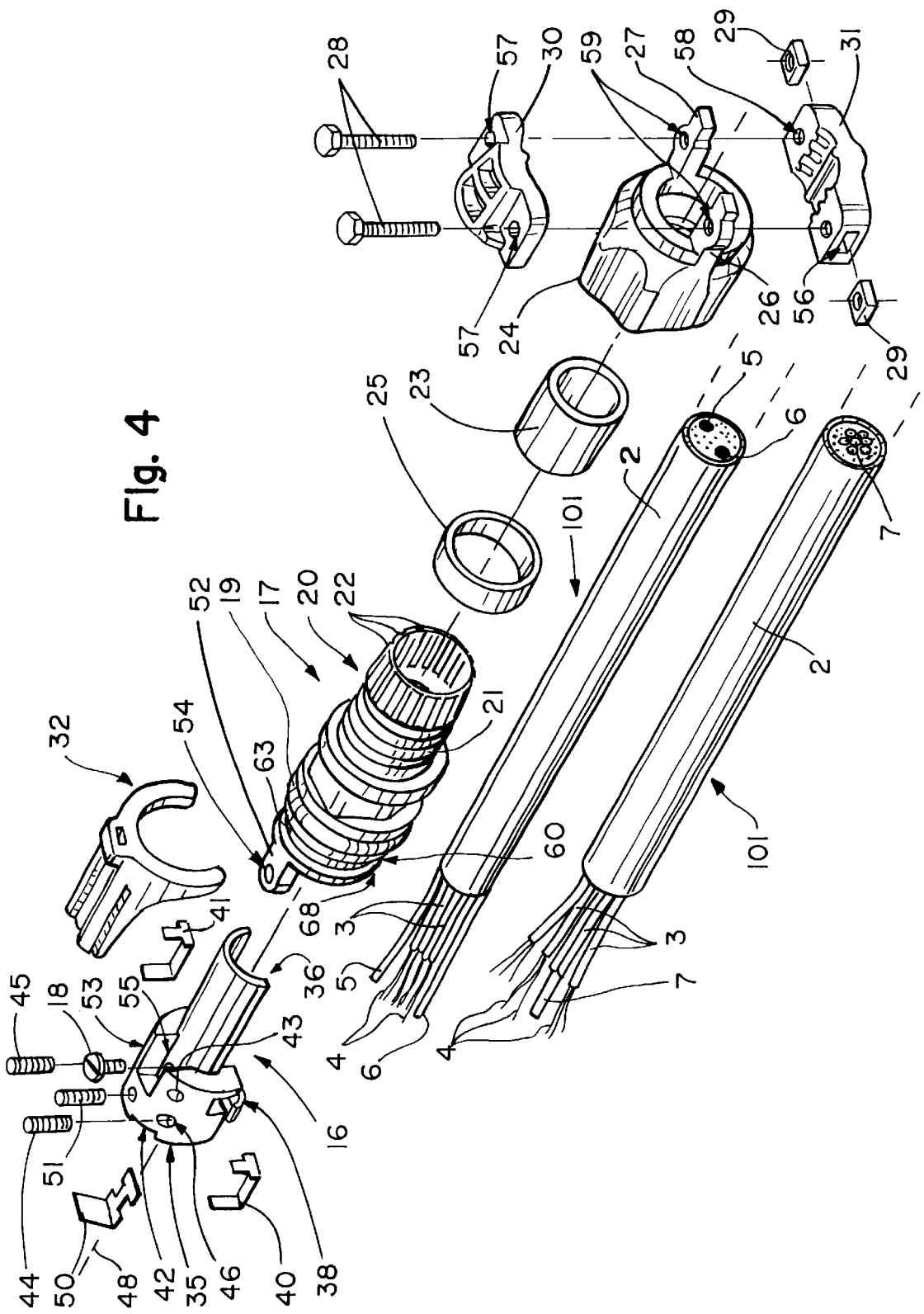
FIG. 4 is an exploded perspective view of a cable inlet device.
Figure 13:
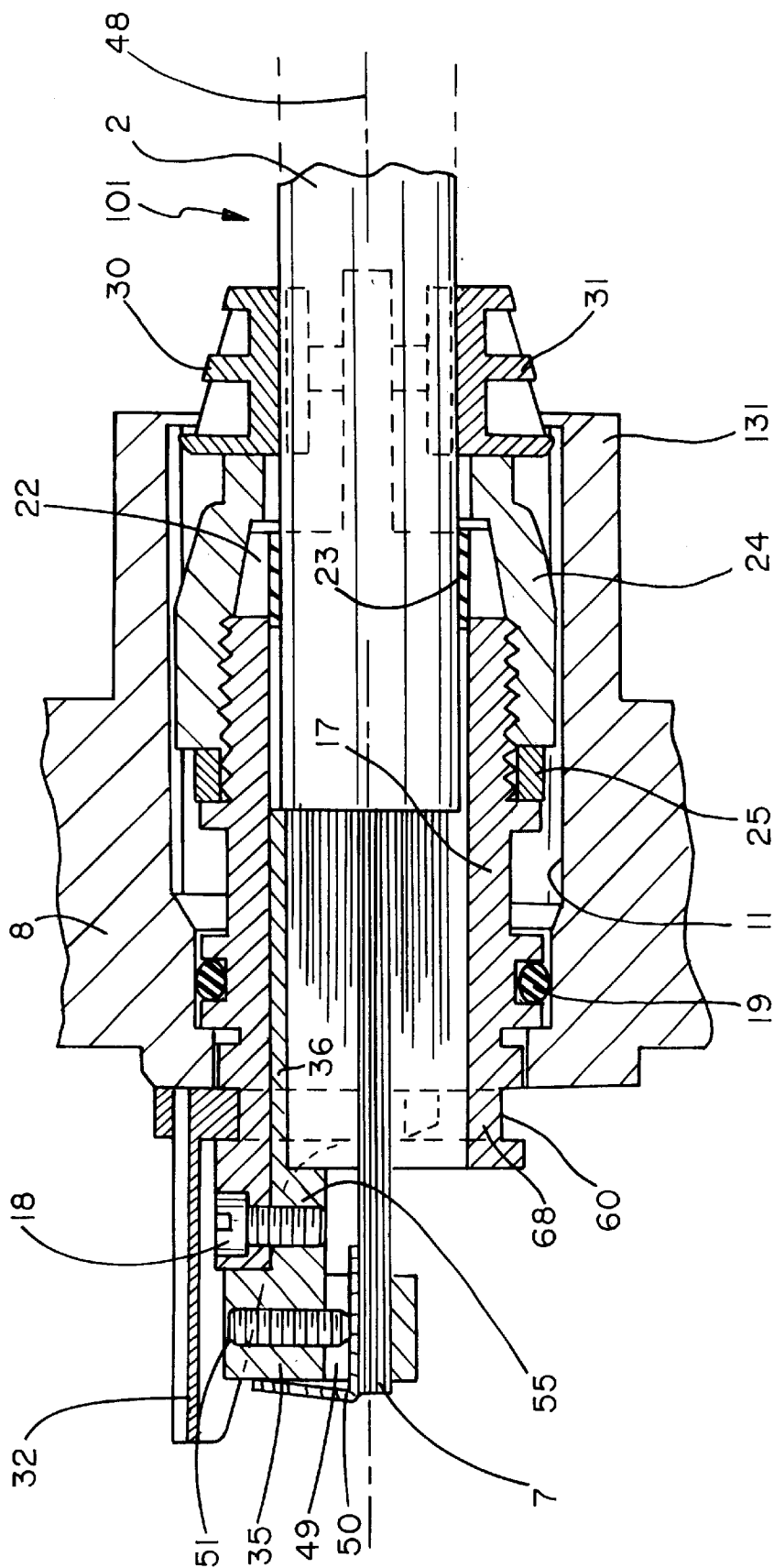
FIG. 13 is a longitudinal axial vertical section view of the cable inlet device as fitted and put in place.

Instead of using side semi-rigid strength members 6, 5 to impart strength to the optical cable 101, it is also possible, as shown diagrammatically by way of example in FIG. 4 and in FIG. 13, to use an axial and central semi-rigid strength member 7, and flexible side strength members (not shown), all this being well known to the person skilled in the art.

In the art, the axial and central semi-rigid strength member 7 may be referred to as a "central strength member", and the cable as stripped as shown in FIG. 4 may be said to be "prepared".

In view of the mechanical weakness of optical fibers, it is necessary for a watertight inlet via which an optical cable can enter a chamber or a container to be provided not only with sealing means, but also with strong means for securing the outer sheath 2 of the cable and its strength members, such as the peripheral strength members 5, 6, or the central strength member 7 and its associated flexible peripheral strength members.

A metal securing solepiece 16 is situated at the front of the device, i.e. at the end that is further downstream relative to the direction in which the optical cable 101 is inserted into the splice box 8.

The securing solepiece 16 is plugged telescopically, as shown in the drawings, and as explained in more detail below, into a tubular sealing body 17 made of a plastics material, these two elements 16 and 17 then being fixed together by means of a locking screw 18.

The sealing body 17 receives an outer O-ring sealing gasket 19 and, if its front portion 68 is shaped to receive the securing solepiece 16, its rear portion 20 is shaped to form a stuffing box, with a thread 21 and abutment fingers 22 which co-operate in conventional manner with an annular sealing gasket 23 in a matched relationship with the diameter of the cable 101, and a very special clamping nut 24 of hexagonal outer section for clamping the outer sheath 2 of the cable 101.

Since optical cables may be of various diameters, a rigid compensation ring 25 is provided, also in a matched relationship with the diameter of the cable 101 used, which compensation ring fits over the thread 21 and limits the clamping of the nut 24 to its correct value, the nut coming into abutment against the ring 25 at the end of the clamping stroke.

The rear portion of the nut 24 is also provided with two longitudinal and side tabs 26, 27 which, via respective ones of two screws 28 and their associated nuts 29, receive the two halves 30, 31 of a clamp for mechanically retaining the cable 101 by the clamp clamping on the outer sheath 2 of the cable.

Finally, a key is provided in the form of a semi-rigid fork 32 that is designed to lock the device once it is fitted to the cable 101 and finally installed in the box 8.

All these elements of the cable inlet device are clearly visible in FIG. 4 and are described briefly above. The following description of the successive stages in which the device is fitted and then put in place will enable the missing details to be given.

With reference to FIG. 5, once the free end 33 of the cable 101 has been cut to the right length but before it has been stripped, the following are successively threaded onto the cable: the very special stuffing-box nut 24, the annular gasket 23, and, if necessary, the compensation ring 25, then the tubular sealing body 17 pre-fitted with the O-ring gasket 19.

The part 17 is made of a plastics material which, while being very rigid, nevertheless remains sufficiently flexible to enable the stuffing box fingers 22 to clamp the annular gasket 23 on tightening the stuffing-box nut 24 (whose inside section is conventionally frustoconical as shown in FIG. 13) onto the nut-receiving thread 21. The plastics material used for said part may, for example, be a non-filled polyamide.

Then, as shown in FIG. 6, the "preparation" of the cable 101 can commence. For the purpose of preparing it, the cable is stripped of its outer sheath 2 and of its small protective tubes 3, starting from the chosen place 34 to release the length of optical fibers 4 desired inside the box 8, and the grease is then removed from the stripped optical fibers 4. The strength members 5, 6 are also cut off so that they extend beyond the transverse stripping plane 34 only by a length substantially equal to the length L of the securing solepiece 16.

The metal solepiece 16 is made in one piece (see also FIG. 4) comprising a head 35 which is designed, as explained below, to secure the peripheral strength members, e.g. the strength members 5 and 6, and the central strength member 7 (FIG. 13) if such a central strength member exists, and a tail 36 in the form of a half cylinder of semi-circular section. As described below, the tail 36 plugs snugly into the tubular orifice formed in the front half 68 of the sealing body 17.

As indicated by arrow 69 in FIG. 6, and as shown in FIG. 7, the securing solepiece 16 is then positioned contiguous with the non-stripped end of the cable 101, i.e. so that the transverse stripping plane 34 and the transverse plane 37 of the rear end of the tail 36 substantially coincide to form a single common transverse plane that is vertical as shown in the drawing.

As shown in FIGS. 7 to 7C, the two peripheral strength members 5 and 6 of the cable are then secured in the head 35 of the securing solepiece 16.

To make such securing possible, the head 35 is provided with two side notches 38 and 39, in which the peripheral strength members 6 and 5 are inserted sideways (see, in particular, FIGS. 4, 7A to 7C).

A respective U-shaped metal clamping piece 40, 41 is mounted in each of the notches 38, 39 to slide downwards along a vertical guide recess 42 and along a vertical guide orifice 43. By tightening the two vertical screws 44 and 45 in their respective tapped vertical orifices 46 and 47, the clamping pieces 40 and 41 are caused to descend and to press strongly against but without damaging respective ones of the two peripheral strength members 6 and 5 that have been inserted into respective ones of the notches 38 and 39.

It should be noted that the head 35 is also shaped to secure the optional central strength member 7 (FIG. 13). For this purpose, the head 35 is provided with an axial orifice 49 extending along the middle longitudinal axis 48 of the device and of section that is oblong in the vertical direction, which orifice receives and holds another securing metal clamping piece 50 (FIGS. 4 and 13). The central strength member 7 is secured, as above, by clamping the central strength member between the clamping piece 50 and the wall of the oblong hole 49 into which the central strength member 7 has been inserted, the clamping also being actuated by means of a vertical clamping screw 51.

The presence of the clamping pieces 40, 41, 50 is not essential, and it is possible, as is the case for copper wires, merely to lock the strength members 5, 6, and 7 by means of corresponding screws 44, 45, and 51. However, such clamping pieces are very useful in this example because they make it possible to secure the strength members 5, 6, 7 strongly without damaging them, which would be detrimental to the reliability of the securing.

Figure 8:
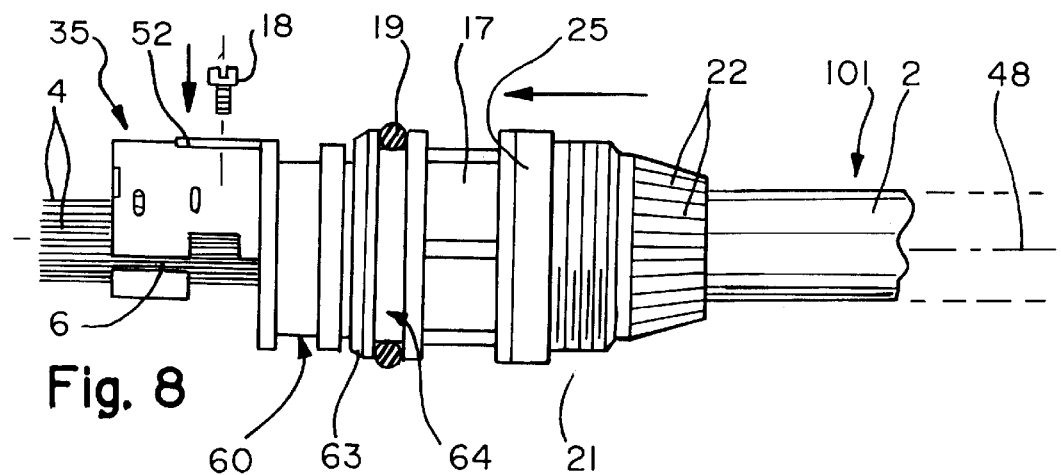

Once the strength members 6, 5 have been secured in this way, the tubular sealing body 17 is grasped, and, as shown in FIG. 8, it is plugged fully onto the tail 36 of the securing solepiece 16.

In order to optimize and to guide this operation, the front periphery of the sealing body 17 is provided (FIG. 4) with a longitudinal projection 52 which plugs into a longitudinal and corresponding female notch 53 in the head 35 of the metal securing solepiece 16. In addition, two side ribs 65, 66 (FIG. 12A) on the cylindrical inside wall of the body 17 participate in guiding the body 17 as it slides over the tail 36 of the metal solepiece 16.

The solepiece 16 is then fixed to the body 17 by means of the screw 18 which passes through a vertical orifice 54 in the projection 52 and screws into vertical tapping 55 in the head 35 (FIGS. 4 and 13), the tapping 55 and the orifice 54 then being in alignment.

Figure 9:
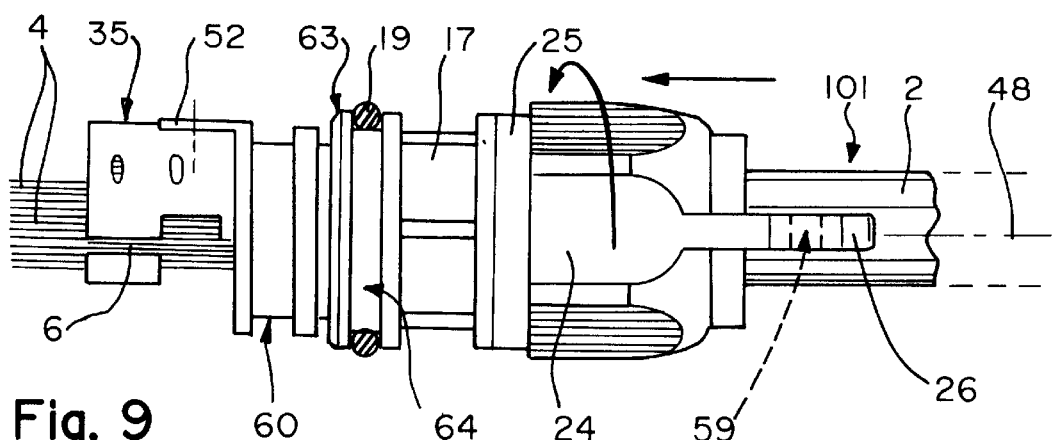
Figure 10:
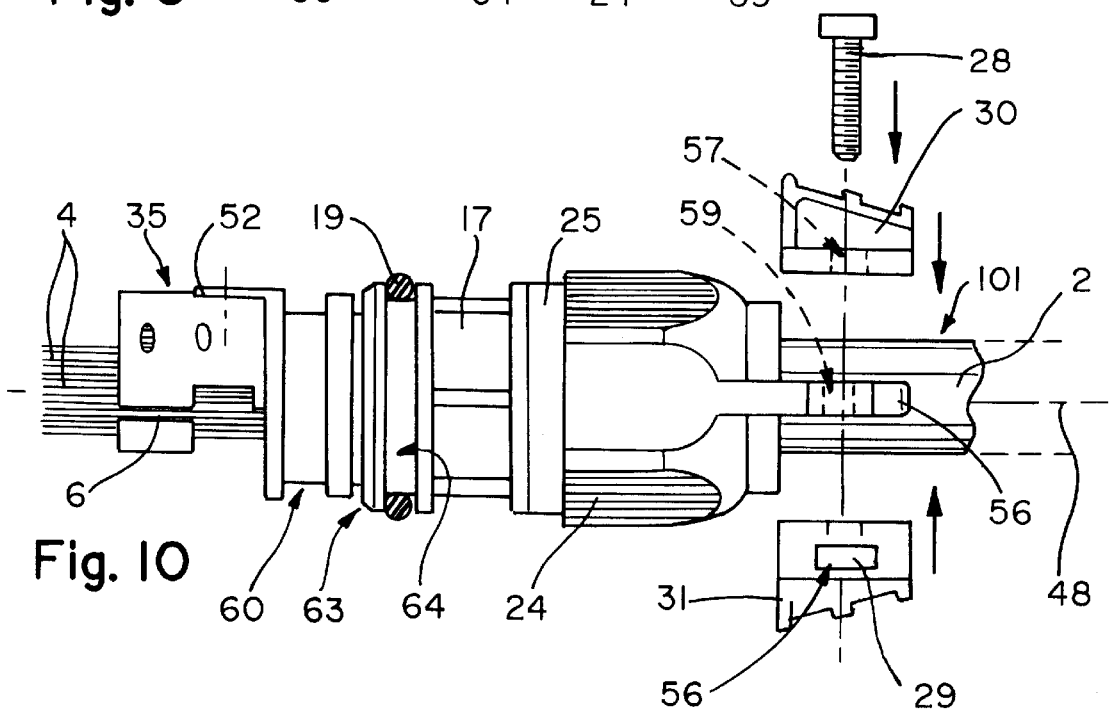

After making sure that the annular sealing gasket 23 and the compensation washer 25 are properly in place, the next step is to tighten the special nut 24 of the stuffing box, as shown in FIG. 9. As mentioned above, sealing is obtained between the nut and the outer sheath 2 of the cable 101 once the nut 24 has been tightened until it comes into abutment against the compensation washer 25.

It should be noted that the hexagonal outside shape of the nut, i.e. it having six facets, enables it to be tightened by means of a wrench.

Then (FIGS. 10 and 11), by means of the retaining clamp in two halves 30, 31, of the two nuts 29, and of the two associated clamping screws 28, the cable 101 is retained on the two rear tabs 26, 27 specially designed for this purpose on the special nut 24 of the stuffing box.

For this purpose, the two square nuts 29 are inserted sideways into their respective nut-receiving cavities 56 in the bottom half of the retaining clamp 31, the two halves of the retaining clamp 30, 31 are put in place so that their orifices 57, 58 through which respective ones of the two screws pass 28 coincide with the orifices 59 through which the screws also pass, and which are provided in respective ones of the rear tabs 26, 27 on the stuffing-box nut 24. The two clamping screws 28 are then tightened until the nut 24, the retaining clamp 30, 31, and the cable 101, via its outer sheath 2, are clamped together strongly.

It should be noted that the retaining clamp 30, 31 is made of a very rigid plastics material, e.g. a polyamide filled with glass fibers.

For example, the body 17 and its associated nut 24 may be made of optionally-filled polyamide, imparting slight flexibility to them, which is essential to stuffing box operation.

Figure 11:
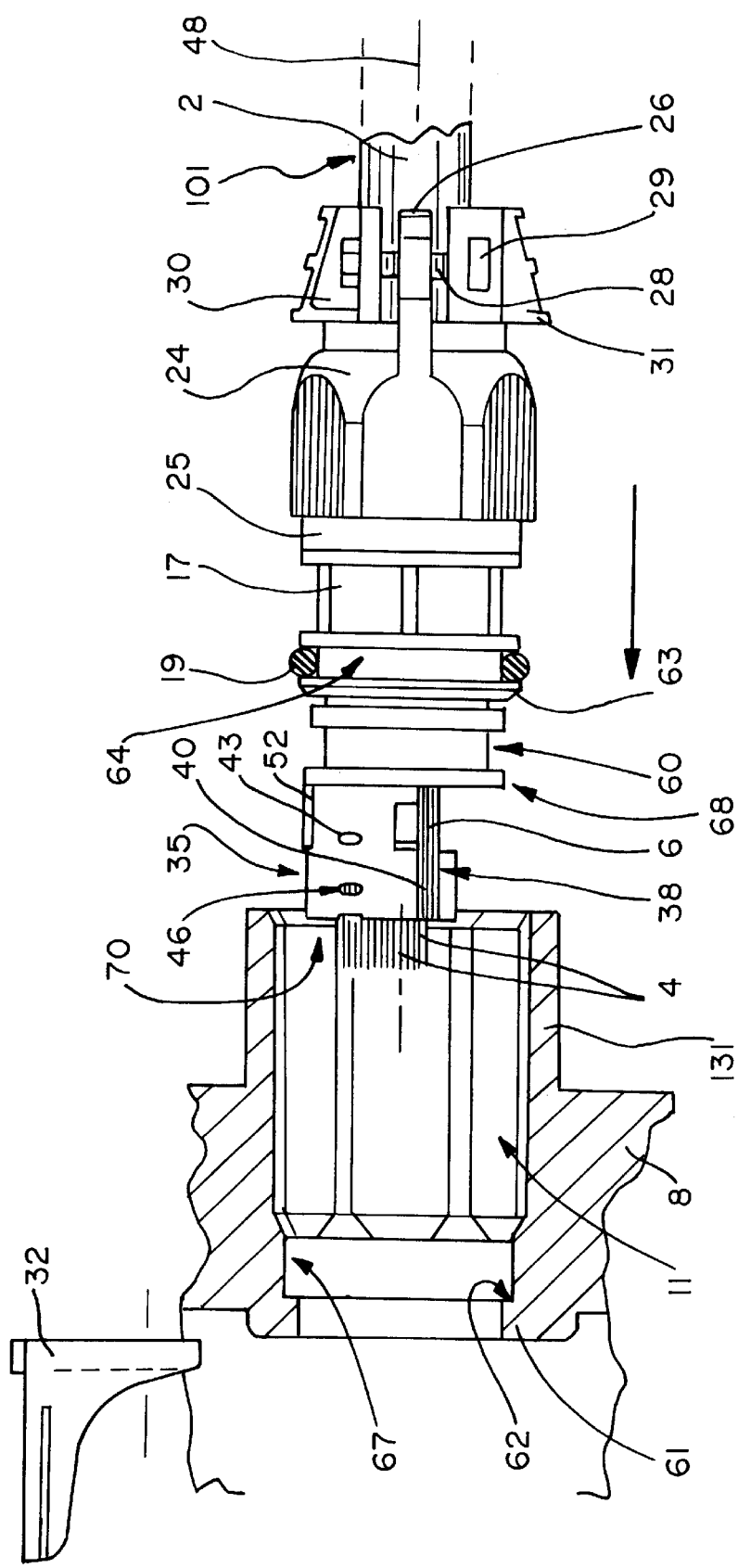

As shown in FIG. 11, the resulting assembly is then fully prepared, secured, and sealed, all this having been advantageously performed outside the splice box 8.

Figure 12:
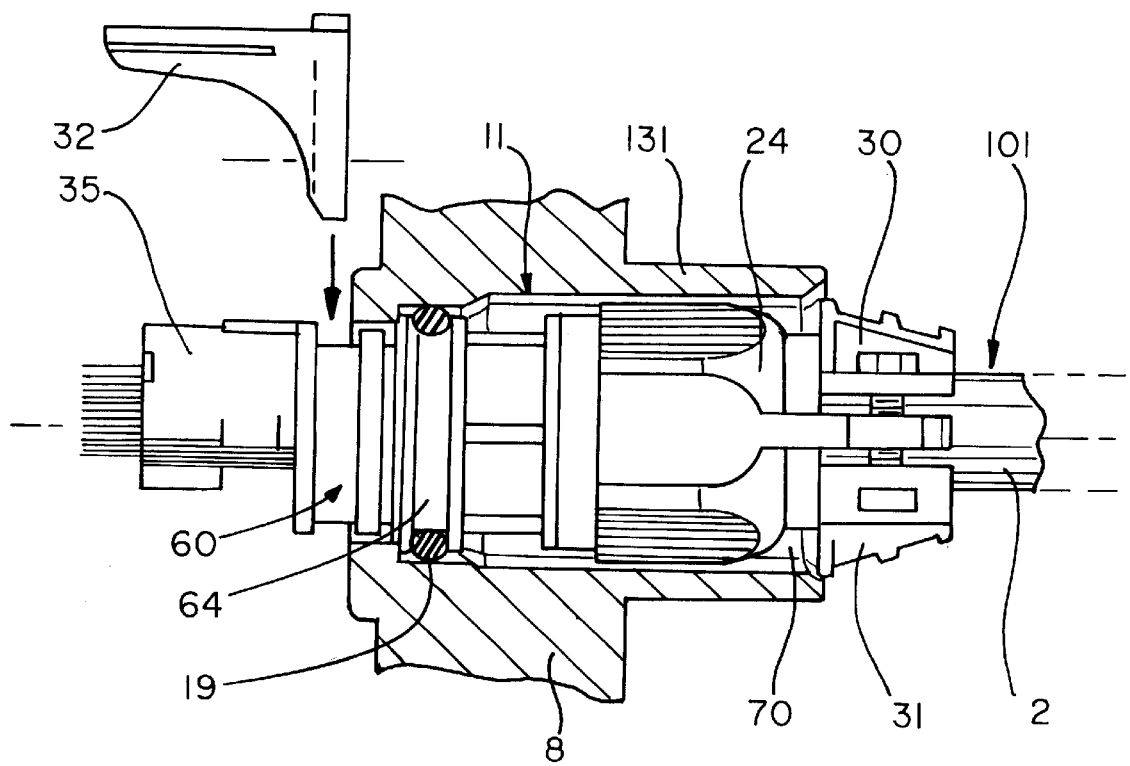

As shown in FIGS. 11 and 12, the following step consists in inserting the assembly into the box 8 via its inlet passageway 11 provided for this purpose, until it comes into abutment in a position (FIG. 12) in which only the head 35 of the metal solepiece 16 and a front groove 60 in the body 17 project beyond the inlet passageway 11 into the box 8, the inlet sealing in the passageway 11 being provided by the above-mentioned O-ring sealing gasket 19.

For this purpose, the inlet passageway 11 has a special shape, corresponding to the shape given to the body 17, this special shape being imparted to it in this embodiment, and therefore in a manner that is in no way limiting, by the shape of the inlet sleeve 131.

As can be seen in the drawings (in particular in FIG. 11), at its front end, the inlet passageway 11 is provided with a reduced outlet section portion 61 which, while enabling the head 35 and the groove 60 to pass through it easily, defines a circular shoulder 62 which, in co-operation with a corresponding annular shoulder 63 on the body 17, positioned slightly upstream from the groove 60 as shown in the drawings, serves as an end-of-stroke abutment on inserting the assembly into the orifice 11.

The O-ring gasket 19 is positioned in an annular groove 64 in the body 17, which groove is, in this example, situated just in front of the abutment shoulder 63, and when the body is in the abutment position as shown in FIG. 9, the gasket 19 is pressed between said groove 64 and the inside wall of the passageway 11, and thus of the inlet sleeve 131, whose section is matched accordingly at this place.

Very advantageously, the rear half 70 of the inlet passageway 11, i.e. the rear inside surface of the inlet sleeve 131 is hexagonal in shape, i.e. it has the female shape corresponding to the hexagonal outside surface of the stuffing box nut 24. In the abutment position shown in FIG. 12, the nut 24 is inserted at least in part into the hexagonal inlet 70 of the passageway 11, thereby preventing it from rotating, so that the cable inlet device is then effective in withstanding any external torsion stresses that are exerted subsequently on the cable 101.

Figure 12A:
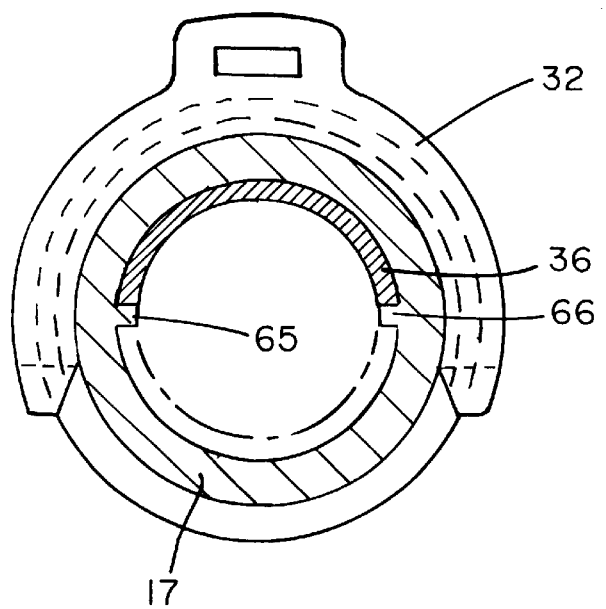

All that then remains to be done, as shown in FIGS. 12, 12A, and 13, is to put the above-mentioned locking fork or key 32 in place by clipping it into the groove 60. The cable inlet is then fully put in place, clamped, locked, and sealed, without it being necessary, as it is in the prior art, to act inside the box, e.g. to perform often difficult tightening operations, and without sealing on the outer sheath of the cable being performed upstream from the point at which it is secured, with the resulting weakening of the sealing.

The device is particularly simple and user-friendly to fit and to put in place, thereby greatly facilitating the task of the user, and, in addition, the amount of longitudinal space that it takes up inside the chamber or container is reduced significantly.

The optical organizer proper, referenced 115, is described below with reference to FIGS. 14 to 22.

As shown in FIGS. 14 and 16, the optical organizer is fixed to the flat bottom 81 of the box 8 by means of self-tapping screws 121.

It comprises a pedestal 122 made of a plastics material and having rounded edges 123 and 124 as mentioned above, and one or more cassette-holding modules, two superposed modules 135 and 136 being shown in this example.

Figure 17:
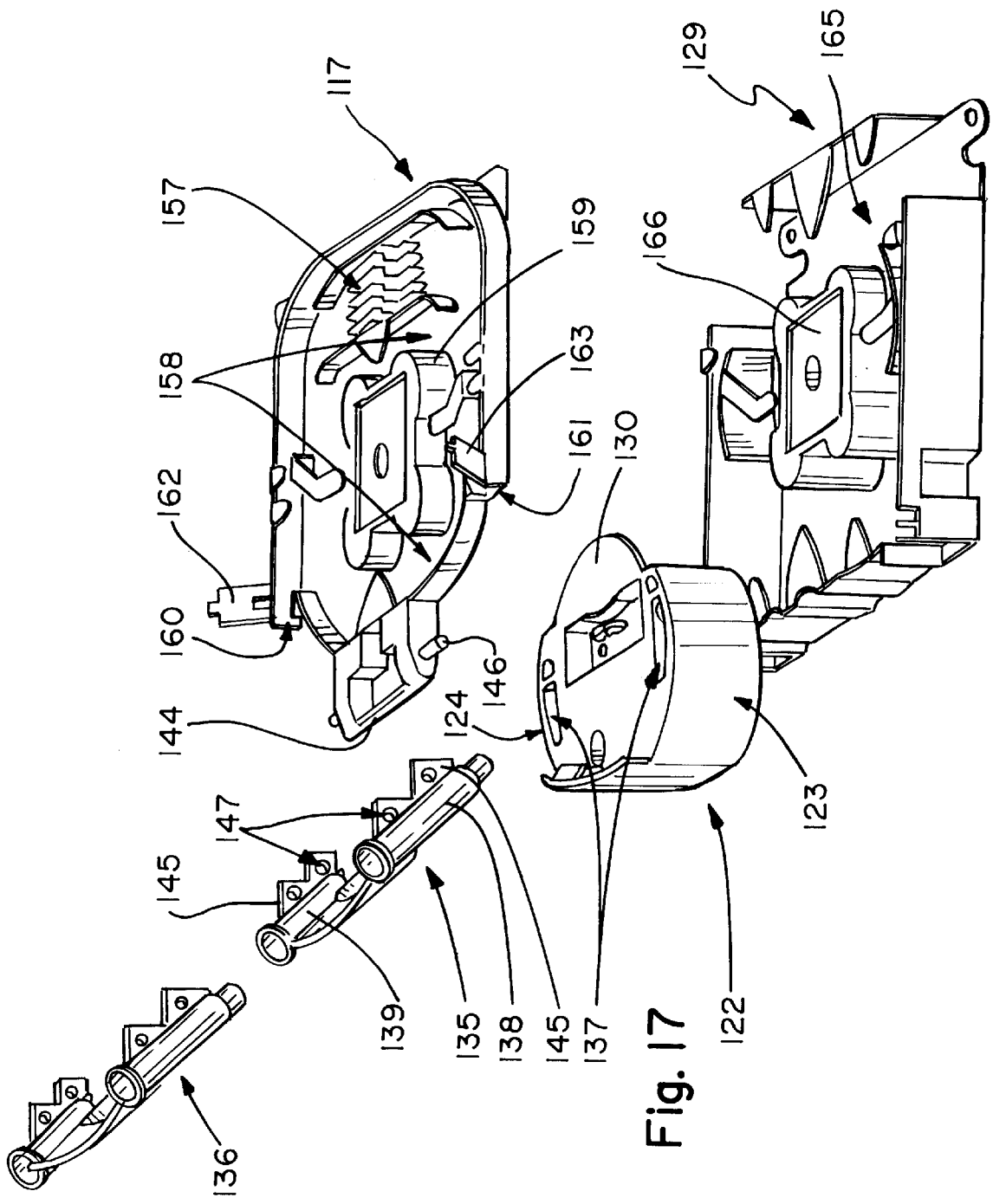
FIG. 17 is an exploded perspective view of the optical organizer, without the optical fibers installed, and with a single cassette for storing splices and surplus lengths.
Figure 21:
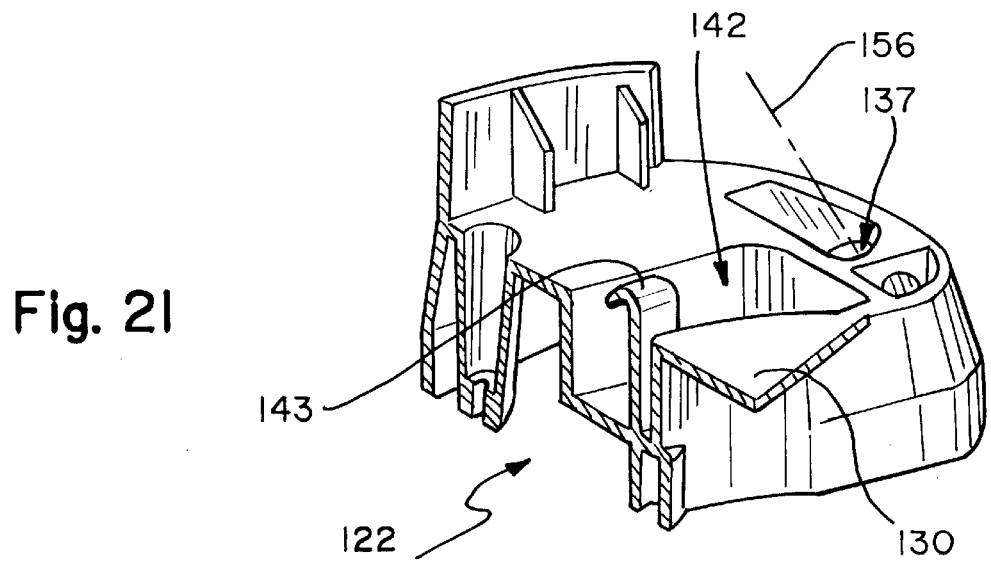
FIG. 21 is a perspective view of the pedestal shown cut in half.

The rounded shape of the pedestal 122 can be seen particularly clearly in FIGS. 17 and 21.

On the downstream side, i.e. on the right of the drawing, the pedestal 122 is provided with a cantilevered-out horizontal platform 130 (FIGS. 14 to 19, and 21), whose plane delimits the top level of the coiling space 126, and which serves (FIGS. 14 and 16) to support the bottom cassette 117 of the stack 117–119 when said bottom cassette is swung down into the horizontal position.

As shown in FIGS. 17 to 21, the pedestal 122 is provided with two orifices 137 for receiving the two tubular supports 138, 139 of the first cassette-holding module 135 by said supports being plugged into said orifices.

The orifices 137 slope at about 45 degrees relative to the horizontal, as shown in the drawings. They are blind orifices whose end walls are provided with respective metal nuts or inserts 140 for receiving respective fixing screws 141 for fixing the two nestable or "extender" modules 135 and 136 to the pedestal 122.

Figure 18:
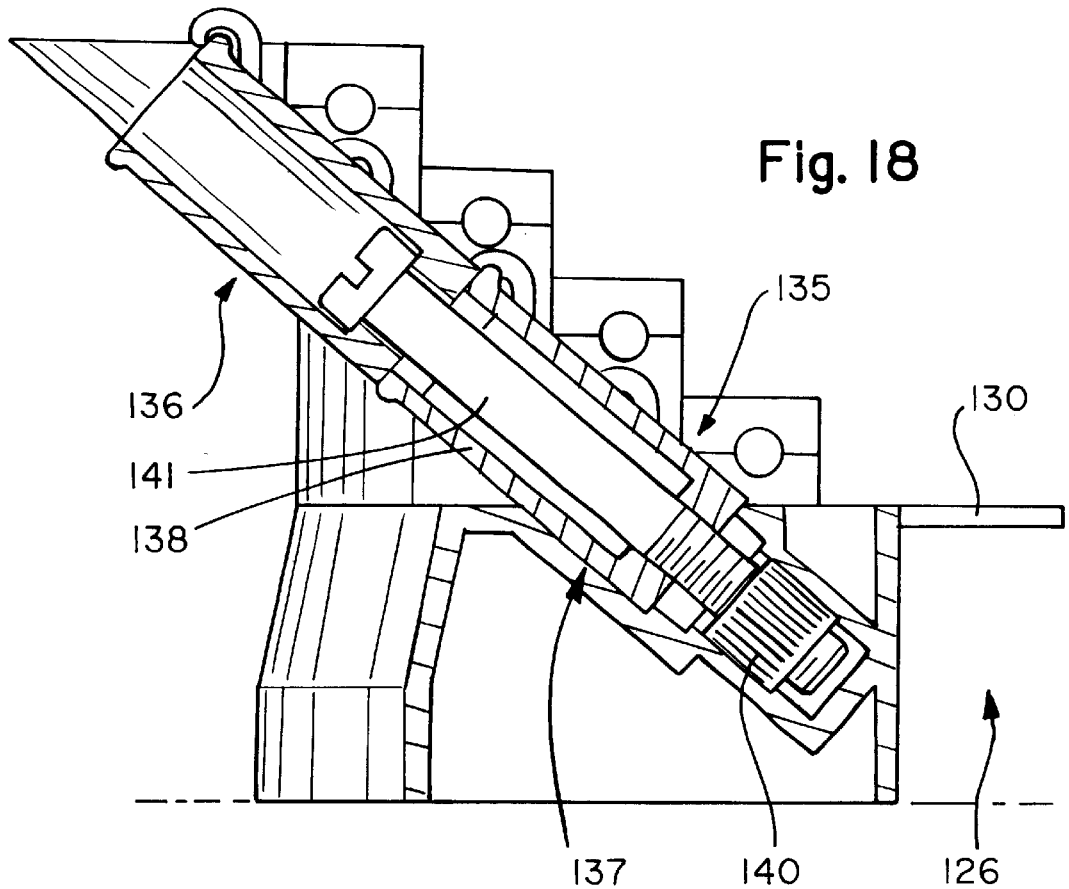
FIG. 18 is a longitudinal vertical section view through the pedestal into which the two nestable or "extender" modules are plugged, the section view including one of the two sloping plug-in axes, and showing the common holding screw.
Figure 19:
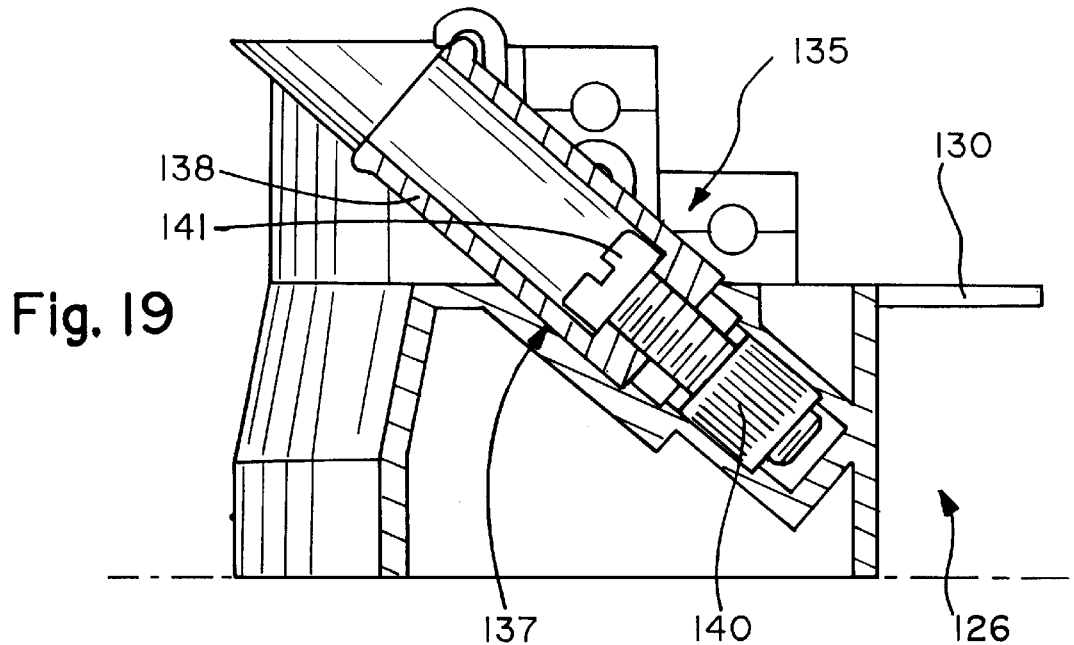

In FIG. 18, in which two modules 135 and 136 are installed on the pedestal 122, the holding screw 141 is longer than the holding screw in FIG. 19, in which only the bottom module 135 is installed on the pedestal.

In addition, in a cavity 142, the pedestal is provided with a crook-shaped vertical projection 143 which, as explained below, serves to hold the bottom cassette 117 in its vertical position. This holding is achieved by clipping a transverse pin 144 of the cassette 117 under the free end of the projection 143, which free end is arcuate in corresponding manner.

The cassette-holding modules 135 and 136, whose number is not limited to two, are identical, and their tubular side supports 138, 139 are shaped not only so that the first module 135 can be plugged into the pedestal 122, but also so that all of the modules 135, 136, . . . , can plug into each other in nested manner, the common plugging direction forming an angle of about 45 degrees relative to the horizontal, as mentioned above for the bottom module 135.

In the case that is shown, each module 135, 136, . . . , in the stack is provided with orifices 147 in respective side lugs 145, which orifices are designed to receive the respective hinge pins 146 of two cassettes 117, 118, and 119, 120 for storing splices and surplus lengths of fibers. Naturally, each of the modules could be designed to receive either a single cassette, or else more than two cassettes.

Figure 20:
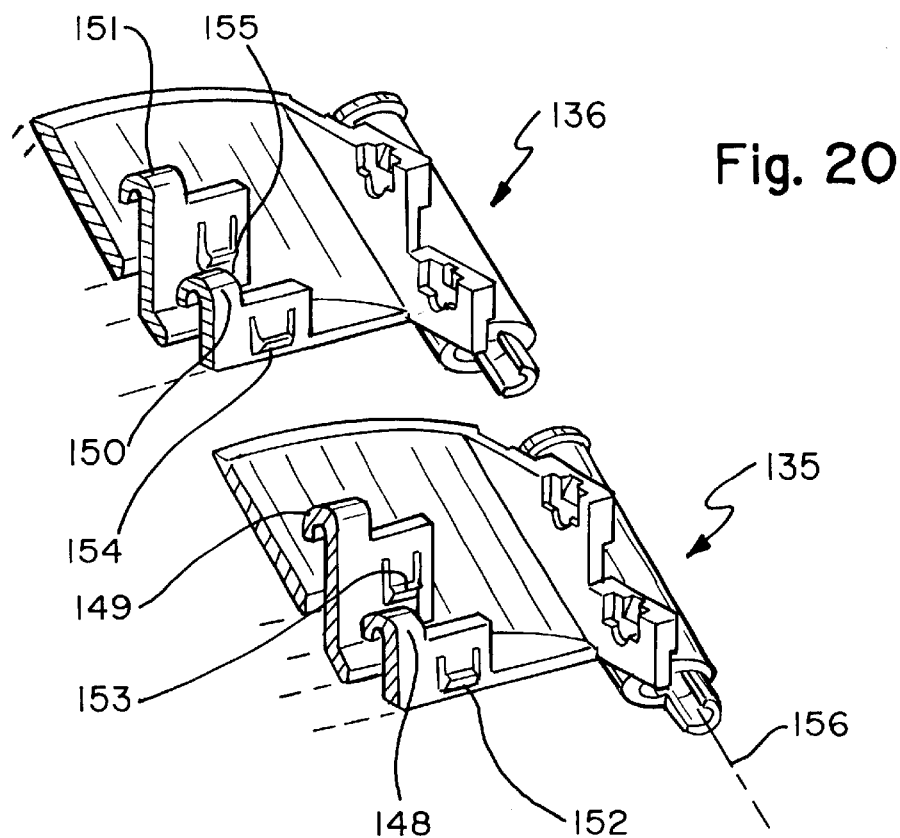
FIG. 20 is a perspective view of the two cassette supports shown in FIG. 17 shown cut in half.

As shown clearly in FIGS. 14, 16, and 20, each of the modules is provided, in a manner similar to the pedestal 122, with two crook-shaped vertical projections, respectively 148, 149, and 150, 151 for receiving, by clipping, the pins 144 of the other cassettes 118, 119, 120, . . . , in the stack of cassettes.

In addition, each of the modules is provided with a number equal to the number of vertical projections 148 to 151 of horizontal holding teeth 152 to 155, once again operating by the pin 144 of each cassette 117 to 120 in its horizontal position being clipped onto its respective tooth 152 to 155.

Each cassette 117 to 120 can pivot about its hinge axis 146 through 90 degrees between a "horizontal" position in which it is parallel to the plane 128 of the bottom 81 of the box, and a "vertical" position in which it has tilted through 90 degrees counterclockwise.

In FIGS. 14 and 16, the first three cassettes 117, 118, 119 in the stack are in the "horizontal" position, and they are very advantageously held in this position by their holding axes 144 being releasably snap-fastened onto the respective holding teeth 152 to 155, while the last cassette 120 is in its "vertical" position, and very advantageously held in this position by its holding axis 144 being releasably snap-fastened onto the respective holding crook 150.

It should be noted that, as is not novel per se, the cassettes 117 to 120 in the stack are offset horizontally from one cassette 117 to the next 118 by a quantity equal to or slightly greater than the thickness of a cassette, thereby defining steps of a flight whose slope relative to the horizontal is equal to or slightly greater than (in view of a small amount of clearance) 45 degrees.

As a result, the plugging axis 156 (FIGS. 20 and 21) along which the extender modules 135, 136, . . . , are plugged into the pedestal 122 also slopes at about 45 degrees, clockwise, relative to the horizontal.

This "flight of steps" configuration, which is quite conventional per se, for the cassettes 117–120 of the stack, enables each of them to be pivoted, as shown in FIGS. 14 and 16, through 90 degrees between a horizontal end position and a vertical end position, whereupon they are then held in either of these two positions by releasable snap-fastening means, in accordance with the invention.

Naturally, in another embodiment, the cassettes may pivot through an angle greater than 90 degrees. It is then necessary merely to provide a relative offset that is significantly greater than the thickness of a cassette, thereby defining an axis 156 sloping at significantly less than 45 degrees, clockwise, relative to the horizontal.

Figure 22:
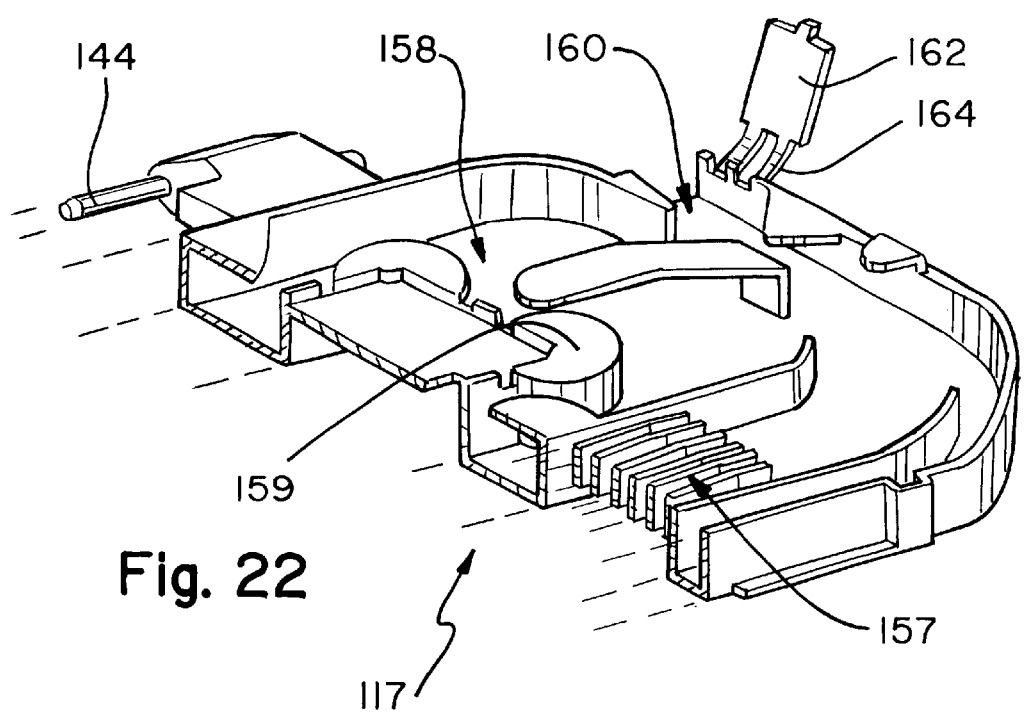
FIG. 22 is a perspective view of a tilting cassette for storing splices and surplus lengths of fibers shown cut in half.

Each of the storage cassettes, such as the cassette 117 that can be seen well in perspective in FIGS. 17 and 22, includes, in conventional manner, a space 157 for storing the splices, and a space 158 for storing surplus lengths of optical fiber by winding or coiling them around a former 159.

A small feature is constituted by the small inlet and outlet corridors 160, 161 for the stripped optical fibers closing onto the optical fibers by means of respective covers 162, 163, each cover being fixed to one side to the cassette 117 via a flexible hinge 164 (FIG. 22) by being integrally molded with the cassette. Conventionally, each of the inlet/outlet corridors is filled with a foam pad (not shown) which grips and protects the stripped fibers.

In addition, as mentioned above, each of the cassettes is provided with hinge pins 146 and with a snap-fastening pin 144 for snap-fastening it in its two end-of-tilt positions, the snap-fastening pin 144 being parallel to the hinge pins 146.

The coiling cassette 129 (FIGS. 17 and 23, in particular) is designed to store standby fibers, and it includes a storage space 165 only, which space is equipped with a central former 166 around which the standby fibers are wound.

The coiling cassette 129 is fixed, as shown in FIG. 14, to the box bottom 81 by means of a self-tapping screw 167.

Naturally, the invention is not limited to the embodiment described and shown.

In particular, the height of the lid 82 depends on the number of modules 135, 136, . . . , which can be plugged into one another and into the pedestal 122.

Also, instead of being fixed together and to the pedestal 122 by means of a screw 141 and of an associated insert 140 (FIGS. 18 and 19), the extender modules 135, 136, . . . , and the pedestal 122 could, as regards their dimensions, be designed so that the modules plug into one another and into the pedestal 122 by being mutually engaged by force-fitting.

What is claimed is:

1. A watertight device designed for interconnecting optical fiber cables, the device being in the form of a watertight box referred to as an optical organizer box which is made up of a substantially flat bottom and of a lid, and which includes means for performing the following four functions:

securing and sealing the optical fibers in inlets;

directing the optical fibers towards the optical organizer proper;

storing the splices and the surplus lengths of optical fiber in pivotally-mounted cassettes equipping said organizer; and optionally storing standby optical fibers, in particular optical fibers of a through cable;

wherein:

for each cable, the device includes an inlet device for providing a watertight cable inlet and for securing the strength members of the cable, which inlet device is fitted to the cable prior to inserting said cable into the box, the outer sheath of the cable then being secured directly on said watertight inlet device and upstream from its sealing means;

all of the watertight inlet devices then being received by being plugged into the same side of the box and then being locked therein merely by keying;

the optical organizer which is separated from the inlet devices by an empty transit space through which the broken-out optical fibers pass, includes a pedestal which is fixed to the bottom of the box and which receives one or more cassette-holding modules for holding cassettes for storing splices and surplus lengths;

each module receiving one or more cassettes so that each cassette can tilt, in known manner, through at least 90 degrees about its base; the modules being stackable in nested manner and in a direction that slopes, in known manner, relative to the plane of the bottom of the box sufficiently to enable each cassette to tilt in this way;

the means, acting by clipping, are organized to hold each cassette in either one of its two end-of-tilt positions;

the pedestal is followed by a second empty space optionally organized to receive other optical fibers referred to as standby optical fibers; and the edges of the box bottom are of a height that is sufficiently small as to enable all of the cassettes in the stack to be accessed freely from the sides.

2. A device according to claim 1,
wherein:
  a) for the optical cables, the device includes respective watertight cable-inlet devices that are disposed side-by-side in row abreast on the same side of the box, and that are positioned in a plane parallel to the plane of the bottom of the box, each of the respective cable-inlet devices comprising:
    at the front: a rigid securing solepiece provided with orifices or slots into which central strength members and/or side strength members of the cable are inserted, each of these orifices or slots co-operating with a clamping member typically acting by a screw being rotated to clamp the strength member(s) that it receives;
    at the rear: a nut for clamping a stuffing box, which nut is also shaped to receive a retaining member for retaining the outer sheath of the optical cable; and
    between the front and the rear: a sealing tubular body whose front portion engages telescopically into said securing solepiece, means being provided for fixing the sealing body to the securing solepiece in the engaged position, the rear portion of the tubular body co-operating with a sealing ring to form the sealing stuffing box that is complementary to said clamping nut, the stuffing box achieving the sealing by clamping on the outer sheath of the cable;
    the sealing body also receiving means for providing the sealing relative to the inlet passageway in the chamber or container, and further including an abutment member which is designed to co-operate with a complementary shape of said inlet passageway to limit the insertion of the device through said inlet passageway, the abutment position then being such that the head of the device emerges inside the chamber or container, keying means then being provided for locking the device in this position;
  b) said pedestal is made of a plastics material and has an outside wall that is orthogonal to the bottom of the box, which wall is rounded to guide the optionally stripped optical fibers of said cables without damaging them on either side of said pedestal;
    the pedestal receiving in plug-in manner support blocks, each of which supports in hinged manner one or more cassettes for storing splices and surplus lengths of fibers, the support blocks being superposable by plugging into one another in nested manner with a stepped offset being provided from one cassette to the next in the stack, this offset being provided, in a manner known per se, at an offset angle of about 45 degrees which corresponds to a step length substantially equal to the thickness of a cassette, so that it is possible in conventional manner to pivot each cassette of the stack through 90 degrees;
    each of the support blocks being provided with clipping means for locking each cassette in two positions, namely a first locking position in which the cassette is parallel to the plane of the bottom of the box, and a second locking position in which the cassette has been rotated about its hinge pins and on its support block through one fourth of a turn so that it is orthogonal to the plane of the bottom of the box; and
  c) the pedestal and the box bottom are designed to delimit a second empty space between the pedestal and the box side that is opposite from the cable inlets and from said transit space, which second empty space is suitable for receiving standby fibers, at least a portion of the second empty space being situated under the first cassette at the bottom of the stack when said cassette is in its first above-mentioned position, and is then cantilevered out over said second empty space, support means for supporting said first cassette in this cantilevered-out position being provided accordingly on said pedestal.

3. An optical organizer device, in particular serving to equip an optical organizer box according to claim 1;
wherein:
  said optical organizer device includes a pedestal which receives one or more cassette-holding modules for holding cassettes for storing splices and surplus lengths;
  each module receiving one or more cassettes in a manner such that each cassette can tilt, through at least 90 degrees about its base;
  the modules being stackable in nested manner in a direction which slopes, sufficiently to enable each cassette to tilt in this way; and
  means acting by clipping are provided to hold each cassette in either one of its two end-of-tilt positions.

4. An optical organizer device according to claim 3;
wherein:
  said optical organizer device includes a pedestal made of a plastics material and having an outside wall that is orthogonal to the bottom of the box, which wall is rounded to guide the optionally stripped optical fibers without damaging them on either side of said pedestal;
  the pedestal receiving in plug-in manner support blocks, each of which supports in hinged manner one or more cassettes for storing splices and surplus lengths of fibers, the support blocks being superposable by plugging into one another in nested manner with a stepped offset being provided from one cassette to the next in the stack, this offset being provided, at an offset angle of about 45 degrees which corresponds to a step length substantially equal to the thickness of a cassette, so that it is possible in conventional manner to pivot each cassette of the stack through 90 degrees; and
  each of the support blocks being provided with clipping means for locking each cassette in two positions, namely a first locking position in which the cassette is parallel to the plane of the bottom of the box, and a second locking position in which the cassette has been rotated about its hinge pins and on its support block through one fourth of a turn so that it is orthogonal to the plane of the bottom of the box.

5. A device according to claim 1, wherein said second empty space is organized to receive at least one cassette for coiling standby fibers.

6. A device according to claim 1, wherein each of said storage cassettes has mutually-aligned hinge pins which are parallel to a pin that serves to hold the cassette releasably in one or its two end-of-tilt positions, by clipping into corresponding shapes in the optical organizer.

7. A device according to claim 6, wherein, to hold each cassette releasably in the other end-of-tilt position, clipping teeth are provided on the optical organizer to clip onto the clipping pin.

8. A device according to claim 1, wherein, on each storage cassette, the small inlet and outlet corridors for the stripped optical fibers close onto said optical fibers by means of respective covers, each of which is fixed to one side of the cassette via a flexible hinge by being integrally molded with the cassette.

9. A device according to claim 1, wherein the lid of the box is fixed to the bottom of the box by means of toggle fasteners.

10. A device according to claim 1, wherein the nestable or extender modules, and the pedestal are, as regards their dimensions, designed so that the modules plug into one another and into the pedestal by being mutually engaged by force-fitting.

* * * * *